(12) United States Patent
Miyasaka

(10) Patent No.: US 8,401,329 B2
(45) Date of Patent: Mar. 19, 2013

(54) IMAGE PROCESSING DEVICE, DISPLAY DEVICE AND IMAGE PROCESSING METHOD, AND ITS PROGRAM

(75) Inventor: Daigo Miyasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 735 days.

(21) Appl. No.: 12/665,799

(22) PCT Filed: May 16, 2008

(86) PCT No.: PCT/JP2008/059014
§ 371 (c)(1),
(2), (4) Date: Dec. 21, 2009

(87) PCT Pub. No.: WO2009/004863

PCT Pub. Date: Jan. 8, 2009

(65) Prior Publication Data

US 2010/0189349 A1    Jul. 29, 2010

(30) Foreign Application Priority Data

Jul. 4, 2007   (JP) ................................. 2007-176161

(51) Int. Cl.
*G06K 9/40* (2006.01)
*G09G 3/36* (2006.01)
*G09G 5/10* (2006.01)

(52) U.S. Cl. ........................... 382/274; 345/89; 345/690

(58) Field of Classification Search .................. 382/274; 345/89, 690
See application file for complete search history.

(56) References Cited

U.S. PATENT DOCUMENTS

| 2002/0051151 A1* | 5/2002 | Ohshima ........................ 358/1.9 |
| 2005/0213157 A1* | 9/2005 | Ho ................................ 358/3.03 |
| 2007/0075928 A1* | 4/2007 | Takeuchi et al. ................ 345/63 |
| 2009/0016633 A1* | 1/2009 | Miyasaka ..................... 382/255 |

FOREIGN PATENT DOCUMENTS

| JP | 63-15576 A | 1/1988 |
| JP | 4-165874 A | 6/1992 |
| JP | 9-44128 A | 2/1997 |
| JP | 10-173488 A | 6/1998 |
| JP | 2003304400 A | 10/2003 |
| JP | 2003333348 A | 11/2003 |

(Continued)

OTHER PUBLICATIONS

International Search Report for PCT/JP2008/059014 mailed Jun. 17, 2008.

*Primary Examiner* — Anand Bhatnagar
*Assistant Examiner* — Soo Park

(57) ABSTRACT

To provide an image processing device, a method and its program, and a display device capable of properly performing gray-scale extension processing with low costs. An image processing device including a detection unit 11 that detects a gray-scale correction application area that is an area where a gray-scale variation should be smoothed in a pixel row of an input digital image signal by successively scanning a pixel row of the digital signal, and an extension correction unit 12 that performs gray-scale correction processing on a gray-scale correction application area detected by the detection unit 11, wherein in the detection unit 11, an output pixel row on which gray-scale correction processing was performed is fed back to and used as an input signal to the detection unit 11, and a gray-scale correction application area is detected by comparing an adjacent gray-scale difference of an input image signal with an adjacent gray-scale difference of the fed-back output pixel row.

20 Claims, 15 Drawing Sheets

FOREIGN PATENT DOCUMENTS

| | | |
|---|---|---|
| JP | 2004054210 A | 2/2004 |
| JP | 2005221593 A | 8/2005 |
| JP | 2006050358 A | 2/2006 |
| WO | 2007063771 A | 6/2007 |
| WO | 2007099755 A | 9/2007 |

\* cited by examiner

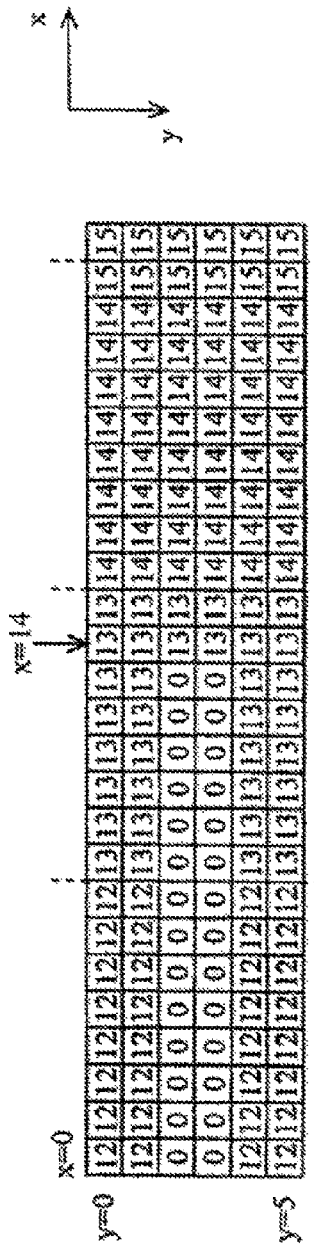
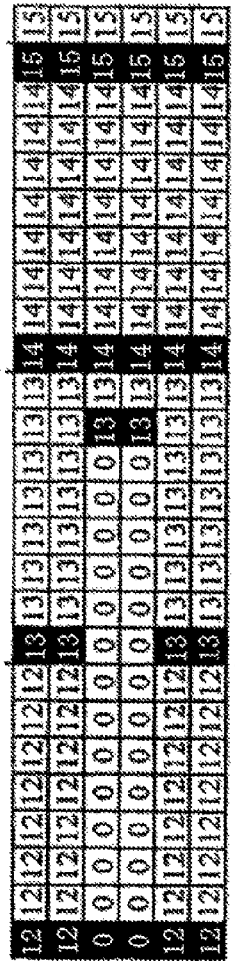
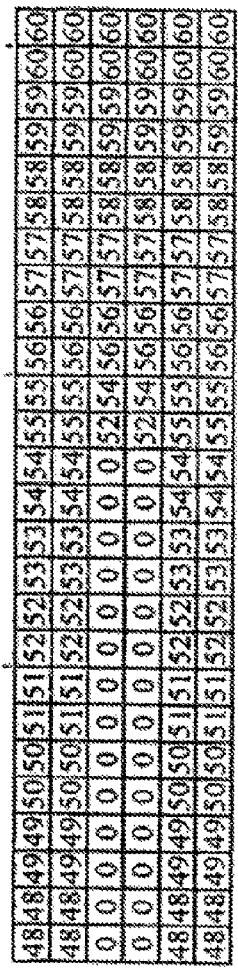
Fig. 3A
Fig. 3B
Fig. 3C

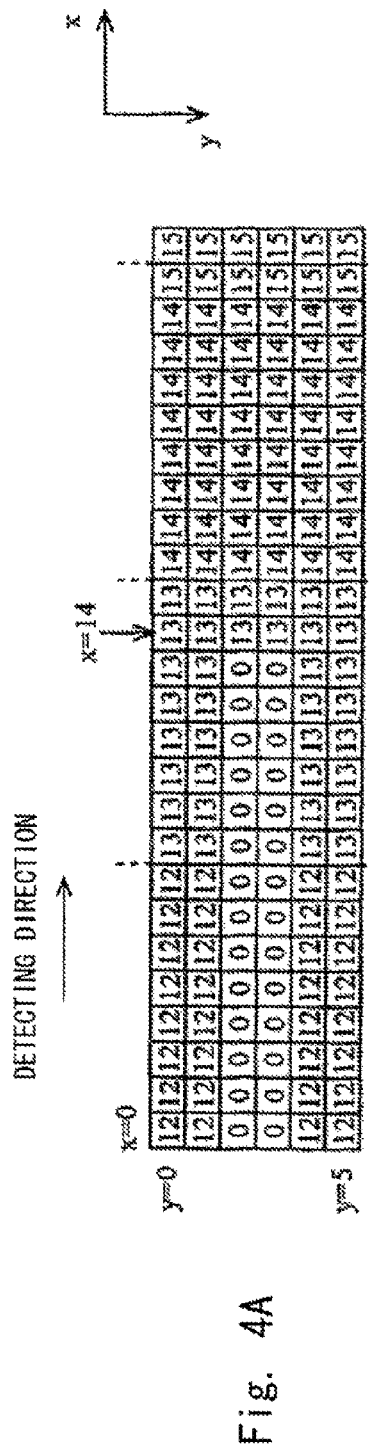
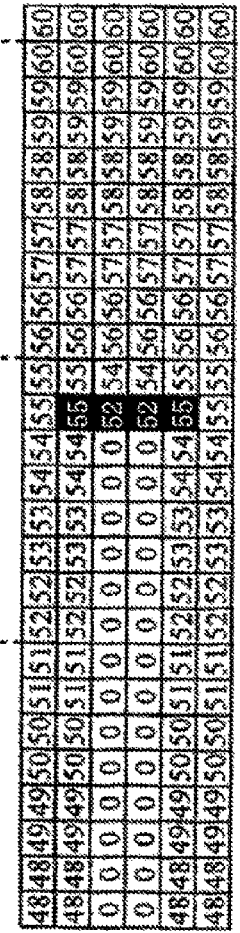
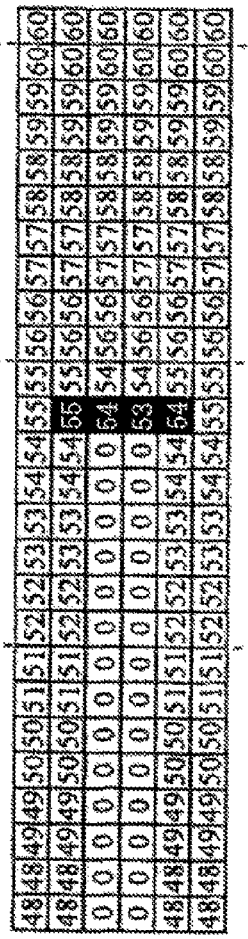
Fig. 4A
Fig. 4B
Fig. 4C

IMAGE PROCESSING DEVICE, DISPLAY DEVICE AND IMAGE PROCESSING METHOD, AND ITS PROGRAM

This application is the National Phase of PCT/JP2008/059014, filed May 16, 2008 which is based upon and claims the benefit of priority from Japanese patent application No. 2007-176161, filed on Jul. 4, 2007, the disclosure of which is incorporated herein in its entirety by reference.

TECHNICAL FIELD

The present invention relates to an image processing device, a method and its program, and a display device, in particular to an image processing device, a method and its program, and a display device that perform gray-scale extending processing on an image.

BACKGROUND ART

In recent years, display devices, typified by flat display devices, have advanced, and the resolution and the number of gray-scale levels have been increased so that more realistic video images having higher image-quality can be displayed. Further, the digitization of video signals transmitted to display devices have also made progress, and 6-bit to 8-bit data, typically, is allocated to each of color components composed of R (red), G (green), and B (blue) for each pixel.

If the number of bits of a video signal is equal to the number of bits that can be displayed on a display device, the input signal is basically used to display an image without carrying out any additional processing in the display device. However, the number of bits of a video signal is often different from the number of bits that can be displayed on a display device.

If the number of bits of a video signal is larger than the number of bits that can be displayed on a display device, the video signal is dealt with by using a method in which a lower-order bit(s) of the video signal are discarded, a dither method, or an FRC (frame rate control) method. On the other hand, if the number of bits of an image signal is smaller than the number of bits that can be displayed on a display device, the video signal is dealt with by using a method different from the above method in order to add an additional lower-order bit(s) (gray-scale extension).

This gray-scale extension is also used in the case where digital image processing according to the characteristics of a display device is performed in the display device. This gray-scale extension is performed, even when the number of bits of the video signal is equal to the number of bits that can be displayed on the display device, in order to improve the arithmetic precision, and after that the video signal is converted into the number of bits that can be displayed on the display device by using the above-mentioned dither method or the FRC.

Such gray-scale extension has not been limited to the use for a method for converting the number of bits of digital signals and for a method for improving arithmetic precision. If the number of bits of a digital signal is small, false contours appearing as contour lines (a phenomenon in which portions that are supposed to vary smoothly in terms of spatial gray-scale variation under normal circumstances are not perceived as varying smoothly but recognized as contour lines) becomes problematic in an area where the gray-scale varies smoothly like a gradation. Accordingly, the gray-scale extension is also used as a technique for preventing such a problem.

The gray-scale extension method is classified into two types, i.e., (1) a method to perform the same processing on all video signals, and (2) a method to detect specific information on an image and perform processing on only necessary pixels according to the detection result.

The first candidate for the above-mentioned item (1) "method to perform the same processing on all video signals" may be a method to adding dither noise or random noise. Although this method can reduce the false contours to some extent, it has a problem that the added noise component is noticeable.

The second candidate may be a method to use a higher-order bit(s) as the lower-order bit(s) to be added. For example, in order to convert a 6-bit input signal "101101" into an 8-bit input signal, two higher-order bits of the input signal are added as two lower-order bits so that a signal "10110110" is obtained.

The third candidate may be a method to simply add either "0" or "1" as a lower-order bit(s).

Although these second and third methods are simple, they cannot suppress the false contours because they do not bring any improvement in the gray-scale difference in a gray-scale varying portion.

Meanwhile, in a "false contour suppression circuit" disclosed in Patent document 1, a method to perform low-pass filter (LPF) processing on a false contour area (first method) is shown as the above-mentioned item (2) "method to detect specific information on an image and perform processing on only necessary pixels according to the detection result". In the invention disclosed in Patent document 1, in order to suppress false contours that are produced by performing a gamma correction (image processing) on a digital video signal, an area where false contours occur is adaptively determined, and the integrated value of video signals of pixels located spatially in the vicinity of that area is output (synonymous with LPF processing). This LPF processing reduces the gray-scale difference in the area where false contours occur.

However, there is a problem that if the intervals at which the false contours occur (in other words, contour line intervals) are larger than the filter size (the integrated range of neighboring pixels), a filtered region and an unfiltered region tends to be easily distinguished from each other in a gradation area, and thus not leading to substantial improvement in image quality even though the false contours are suppressed. If the filter size is increased to cope with the problem, it is necessary to prepare a frame memory capable of storing an image data equivalent to an entire screen, and consequently increasing the costs for hardware necessary for the processing.

As a second method, in a "digital signal processing device" disclosed in Patent document 2, a method to reduce false contours that are produced by performing a gamma correction (image processing) is disclosed, in which when a smoothly varying area (gradation area) is determined, gray-scale values of pixels located between contour lines of the false contours in that area are obtained by linearly interpolating gray-scale values of pixels located on the contour lines. This method can realize uniform spatial gray-scale variation within a gradation area, and thus not suffering from the problem of the first method.

From the fact described above, as a method to extend gray-scale, the method in which specific information on pixels are detected and linear interpolation is performed according to the detection result is also desirable in terms of the suppression of false contours. The method using linear interpolation is also disclosed in Patent document 3 "Image processing device, Image processing method, Program and Recording medium", Patent document 4 "Color signal extending device and Color signal extending method", and Patent document 5 "Image processing device and Image processing method, and Image display device, Mobile electronic device".

To begin with, the purpose of performing linear interpolation in the techniques disclosed in Patent documents 3 to 5 is different from that of the techniques disclosed in Patent documents 1 and 2. That is, the gray-scale extension is performed to solve such a problem that false contours occur because the bit depth of a digital video signal is small or to make full use of the gray-scale capability of a display device, rather than suppressing false contours that occur during the image processing. However, the linear interpolation method itself is the same.

The image processing device disclosed in patent document 3 includes a false contour detector and a pixel value convertor. The detection conditions of the false contour detector include a situation where after the same brightness level continues in the horizontal direction over two pixels or more, the brightness level increases by 1 (Condition 1), and a situation where after the brightness level decreases by 1, the same brightness level continues in the horizontal direction over two pixels or more (Condition 2). Then, the pixel value converter performs linear interpolation on a detected false contour.

The color signal extending device disclosed in Patent document 4 includes a data distribution detection unit and a data depth extension unit. The data distribution detection unit extracts (detects), from the data value distribution state, pixels having such a distribution state that the color varies gently. Specifically, it detects an area where, in a pixel group K where the same gray-scale continues, the number of pixels is greater than or equal to a lower-limit threshold P and smaller than or equal to an upper-limit threshold Q, and the gray-scale difference from pixels of an adjacent pixel group is smaller than or equal to a decision threshold S. Then, the data distribution detection unit performs linear interpolation on the area where the color varies gently, and determines a gray-scale value to be added. The data depth extension unit assigns a value corresponding to the value to be added to an extension portion, and generates extended data obtained by extending the data depth of the color signal.

The image processing device disclosed in Patent document 5 includes detecting means and signal extending means. The detecting means determines whether or not the difference between an initial position from which the same pixel data continues and another initial position from which the next pixel data continues is equal to a width over which the same data continues. Further, it also determines whether the image data value of pixels where the same image data continues is greater by 1 or smaller by 1 than the image data value of pixels where the next image data continues. Based on the decision result, the signal extending means extends the gray-scale of the image data smoothly and linearly (as linear interpolation) such that smoothly continuous image is formed in the area where pseudo-contours is occurring.

However, in the inventions disclosed in Patent documents 3 to 5, detection processing is performed only in a specific direction (e.g., horizontal direction) of the image plane. Therefore, in order to obtain a sufficient effect from the gray-scale extension processing, it has been necessary to perform detection processing in two directions. However, to perform detection processing in two directions, it requires a frame memory capable of storing an image data equivalent to an entire screen (i.e., to perform detection processing in a direction perpendicular to the raster direction, it is necessary to temporarily store the image signal in a frame memory), and consequently increasing the costs of the processing device.

In the case where a line memory, which is more inexpensive than the frame memory, is used, the gray-scale extension processing is performed only in one direction (e.g., horizontal direction) on a line-by-line basis.

PATENT DOCUMENT 1

Japanese Unexamined Patent Application Publication No. 63-15576

PATENT DOCUMENT 2

Japanese Unexamined Patent Application Publication No. 4-165874

PATENT DOCUMENT 3

Japanese Unexamined Patent Application Publication No. 2003-304400

PATENT DOCUMENT 4

Japanese Unexamined Patent Application Publication No. 2003-333348

PATENT DOCUMENT 5

Japanese Unexamined Patent Application Publication No. 2004-54210

DISCLOSURE OF INVENTION

Technical Problem

In the gray-scale extension processing in accordance with each of the above-mentioned Patent documents (hereinafter called "related art"), the use of a frame memory to perform detection in two directions increases the manufacturing costs of the processing devices. Further, if the detection/correction processing is performed only in one direction by using a line memory in order to reduce the costs, correlation between image lines are not taken into account at all. As a result, line-shaped noise may appear, and thus causing a problem that desirable gray-scale extension processing cannot be performed.

The present invention has been made in view of these problems, and an object thereof is to provide an image processing device, a method and its program, and a display device capable of properly performing gray-scale extension processing with low costs.

Technical Solution

To achieve the above-mentioned object, the present invention provides, in accordance with a first aspect, an image processing device including: a detection unit that detects a gray-scale correction application area that is an area where a gray-scale variation should be smoothed in a pixel row of an input digital image signal by successively scanning a pixel row of the digital signal; and an extension correction unit that performs gray-scale correction processing on a gray-scale correction application area detected by the detection unit, wherein in the detection unit, an output pixel row on which gray-scale correction processing was performed is fed back to and used as an input signal to the detection unit, and a gray-scale correction application area is detected by comparing an adjacent gray-scale difference of an input image signal with an adjacent gray-scale difference of the fed-back output pixel row.

In accordance with the first aspect of the present invention, the image processing device preferably includes a first line buffer that retains an input image signal, and a second line buffer that retains an output pixel row. In addition, an adjacent gray-scale difference of an input image signal is preferably calculated based on the value of the input image signal and the value of the immediately preceding input image signal retained in the first line buffer.

In accordance with the first aspect of the present invention, when the image processing device includes a first line buffer that retains an input image signal and a second line buffer that retains an output pixel row, an adjacent gray-scale difference of an output image signal is preferably calculated based on the value of the output pixel row and the value of the immediately preceding output pixel row retained in the second line buffer.

Further, to achieve the above-mentioned object, the present invention provides, in accordance with a second aspect, an image processing device including: a detection unit that detects a gray-scale correction application area that is an area where a gray-scale variation should be smoothed in a pixel row of an input digital image signal by successively scanning a pixel row of the digital signal; an extension correction unit that performs gray-scale correction processing on a gray-scale correction application area detected by the detection unit; and a digital image processing unit that performs processing involving gray-scale variation on an input image, wherein in the detection unit, an output pixel row on which gray-scale correction processing was performed is fed back to and used as an input signal to the detection unit, and a gray-scale correction application area is detected by comparing an adjacent gray-scale difference of a signal on which image processing is not yet performed with an adjacent gray-scale difference between a signal on which image processing was performed and a fed-back output pixel row.

In accordance with the second aspect of the present invention, the image processing device preferably includes a third line buffer that retains a signal on which image processing is not yet performed, and a fourth line buffer that retains a signal on which image processing was performed. In addition, more preferably, an adjacent gray-scale difference of a signal on which image processing is not yet performed is calculated based on the value of the signal on which image processing is not yet performed and the value of the immediately preceding signal retained in the third line buffer on which image processing is not yet performed.

In accordance with the second aspect of the present invention, when the image processing device includes a third line buffer that retains a signal on which image processing is not yet performed and a fourth line buffer that retains a signal on which image processing was performed, an adjacent gray-scale difference of a signal on which image processing was performed is preferably calculated based on the value of the signal on which image processing was performed and the value of the immediately preceding signal retained in the fourth line buffer on which image processing was performed.

In a configuration in accordance with either one of the first and second aspects of the present invention, a maximum acceptable value for the adjacent gray-scale difference of an output pixel row on which gray-scale correction processing was performed is preferably set in the extension correction unit, and if the adjacent gray-scale difference exceeds that maximum acceptable value, gray-scale correction processing is preferably not performed. Further, in the extension correction unit, an amount of a gray-scale variation by the gray-scale correction processing in a boundary area where execution/non-execution of gray-scale correction processing is changed is preferably made smaller than that of areas other than the boundary area.

Further, to achieve the above-mentioned object, the present invention provides, in accordance with a third aspect, a display device including: image processing means including: a detection unit that detects a gray-scale correction application area that is an area where a gray-scale variation should be smoothed in a pixel row of an input digital image signal by successively scanning a pixel row of the digital signal, feeding back an output pixel row on which gray-scale correction processing was performed and using the fed back output pixel row as an input signal, and comparing an adjacent gray-scale difference of the input image signal with an adjacent gray-scale difference of the fed-back output pixel row; and an extension correction unit that performs gray-scale correction processing on a gray-scale correction application area detected by the detection unit; and display means that display an image according to an output signal from the image processing means.

Further, to achieve the above-mentioned object, the present invention provides, in accordance with a fourth aspect, a display device including: image processing means including: a detection unit that detects a gray-scale correction application area that is an area where a gray-scale variation should be smoothed in a pixel row of an input digital image signal by successively scanning a pixel row of the digital signal, feeding back an output pixel row on which gray-scale correction processing was performed and using the fed back output pixel row as an input signal, and comparing an adjacent gray-scale difference of a signal on which image processing is not yet performed with an adjacent gray-scale difference between a signal on which image processing was performed and the fed-back output pixel row; an extension correction unit that performs gray-scale correction processing on a gray-scale correction application area detected by the detection unit; and a digital image processing unit that performs processing involving gray-scale variation on an input image; and display means that display an image according to an output signal from the image processing means.

Further, to achieve the above-mentioned object, the present invention provides, in accordance with a fifth aspect, an image processing method including: a detecting step of detecting a gray-scale correction application area that is an area where a gray-scale variation should be smoothed in a pixel row of an input digital image signal by successively scanning a pixel row of the digital signal; and an extension correcting step of performing gray-scale correction processing on a gray-scale correction application area detected by the detecting step, wherein in the detecting step, an output pixel row on which gray-scale correction processing was performed is fed back to and used as an input signal, and a gray-scale correction application area is detected by comparing an adjacent gray-scale difference of an input image signal with an adjacent gray-scale difference of the fed-back output pixel row.

Further, to achieve the above-mentioned object, the present invention provides, in accordance with a sixth aspect, an image processing method including: a detecting step of detecting a gray-scale correction application area that is an area where a gray-scale variation should be smoothed in a pixel row of an input digital image signal by successively scanning a pixel row of the digital signal; an extension correcting step of performing gray-scale correction processing on a gray-scale correction application area detected by the detecting step; and a digital image processing step of performing processing involving gray-scale variation on an input image, wherein in the detecting step, an output pixel row on which gray-scale correction processing was performed is fed back to and used as an input signal, and a gray-scale correction application area is detected by comparing an adjacent gray-scale difference of a signal on which image processing is not yet performed with an adjacent gray-scale difference between a signal on which image processing was performed and a fed-back output pixel row.

Further, to achieve the above-mentioned object, the present invention provides, in accordance with a seventh aspect, a program that causes a computer to execute an image processing method in accordance with above-mentioned fifth or sixth aspect.

Advantageous Effects

In accordance with the present invention, an image processing device, a method and its program, and a display device capable of properly performing gray-scale extension processing with low costs can be provided.

BEST MODE FOR CARRYING OUT THE INVENTION

Principle of the Invention

In gray-scale extending processing in accordance with the related art, a detection condition that areas over which the same gray-scale continues are adjacent and the gray-scale difference between those areas is less than or equal to a certain value is used as a condition with which areas where false contours occur or areas where the gray-scale variation should be smoothed by performing gray-scale extension processing by linear interpolation (hereinafter called "linear interpolation application areas") are detected. Since this method performs detection by using gray-scale data in only one direction (e.g., horizontal direction) as reference, correlation between gray-scale data in a direction perpendicular to the reference (e.g., vertical direction) in the image plane is not taken into account at all. Therefore, in order to perform the above-mentioned gray-scale extending processing in accordance with the related art more properly, it is necessary to perform detection processing in two directions. Consequently, the use of a frame memory is required, and therefore it is very difficult to install a device that performs gray-scale extending processing by detecting areas where the gray-scale variation should be smoothed in two directions in an apparatus for which low costs are desired.

Meanwhile, in the case of the gray-scale extending processing in which detection processing is performed only in one direction, the frame memory is unnecessary. However, though depending on the image, undesired results like ones shown below may be obtained from the gray-scale extending processing.

Problems of the above-mentioned related art are explained in a specific manner with reference to FIGS. 1 to 3. FIGS. 1 and 2 show two types of flows of detection processing and gray-scale extending processing in one direction, and FIG. 3 shows results obtained when the processing is performed in multiple lines.

FIG. 1(a) shows a case where a 6-bit image signal is input; FIG. 1(b) shows a detection processing result in gray-scale extending processing in accordance with the related art; and FIG. 1(c) shows a processing result when the image is extended and corrected to 8 bits (i.e., two bits to be added are generated). Note that the horizontal and vertical axes of FIG. 1 represent positions x and gray-scale values f(x), respectively, of pixels, and that one pixel of a digital video signal is represented by a rectangle.

In FIG. 1(a), an input gradation image signal is expressed as "(001100)bin" ("(XXXXXX) bin" represents a binary number) from f(0) to f(7), "(001101)bin" from f(8) to f(15), "(001110)bin" from f(16) to f(23), and "(001111)bin" at f(24) and f(25). Since f(x) varies smoothly with the change in the position x of pixels in this manner, this pixel row is considered to be expressing a gradation. The smoother the gray-scale variation is, the more desirable the gradation image becomes.

When this 6-bit image is to be extended and corrected to 8 bits, contour detection and detection of linear interpolation application areas are first performed. A position x=0 and a gray-scale value f(0)=(001100)bin are retained as a starting-point position Xs and a starting-point gray-scale Ts respectively. Next, a minimum position x that is greater than Xs and satisfies f(x) is not equal to Ts is detected. In this example, since f(8)=(001101)bin is not equal to Ts and Xs<8, a position x=8 is defined as detection point. Further, the gray-scale difference between f(8) and f(0) is 1 (minimum gray-scale difference), and therefore it is considered to be a linear interpolation application area. After that, detection similar to the above-mentioned detection is successively performed by using the detection point and the detected gray-scale as a starting-point and a starting-point gray-scale respectively. FIG. 1(b) shows the result. Four positions, i.e., x=8, 16 and 24, as well as x=0 are detected as detection points. Since the gray-scale difference for all the detection points is 1 and the same gray-scale continues over the detection points, this pixel row is considered to be a linear interpolation application area at least from x=0 to 24.

Next, gray-scale extension of two bits is performed based on the above-mentioned detection result. Interpolation processing is performed in an area that has been regarded as a linear interpolation area in the detection processing. Firstly, gray-scale values are connected by a straight line between respective detection points (an oblique dotted line in FIG. 1(c)). Then, additional two bits are selected such that the value closest to this straight line is obtained. For example, assuming that the starting-point and the end point of the straight line are a starting-point position Xs and an end-point position Xe respectively, the value of the additional two bits can be obtained by the following equation (on the assumption that the all digits to the right of the decimal point are discarded) in an area from x=0 to 8.

$$(\text{Additional value}) = ((x-Xs)/(Xe-Xs)) \times 4 = ((x-0)/(8-0)) \times 4$$

In the equation, "4" is obtained from an equation expressed as 2 to the power of (additional bits). From the above-mentioned equation, bits to be added become (00)bin when x=0, 1; (01)bin when x=2, 3; (10)bin when x=4, 5; and (11)bin when x=6, 7. By adding two bits obtained in this manner to the higher-order six bits as LSBs, an 8-bit extended and corrected data is obtained. Note that (00)bin is added to gray-scale values that are not contained in the linear interpolation application area (e.g., a gray-scale value at x=25) as LSBs.

As can be seen from the processing result of FIG. 1(c), the gray-scale difference at a detection point, at which the gray-scale difference would become a difference of four gray-scale due to the conversion into eight bits when "00" is simply added, becomes a difference of one gray-scale, and thus enabling a smooth gray-scale variation to be realized.

Meanwhile, FIG. 2 shows a result obtained by performing the same processing on an image having different gray-scale values. FIG. 2(a) is different from FIG. 1(a) in that the values are entirely (000000)bin from x=0 to x=13.

FIG. 2(b) shows a detection result of contour detection and detection of linear interpolation application areas. Similarly to the previous example, a starting-point gray-scale Ts is retained while defining a position x=0 as a starting-point position Xs. A position that satisfies f(x) is not equal to Ts for the first time is a position x=14, and after that detection processing is successively performed and a gray-scale variation is detected at x=16 and 24.

A linear interpolation application area is determined based on this result. Cases where following three conditions are used as conditions with which a linear interpolation application area is detected are explained hereinafter.

(1) The same gray-scale as that at the starting-point position continues over a plurality of pixels, and the same gray-scale as that at the end-point position continues over a plurality of pixels.

(2) The gray-scale variation at the starting-point position is a gray-scale variation that should be smoothed by a decrement, or the gray-scale variation at the end-point position is a gray-scale variation that should be smoothed by an increment (specifically, the difference between the gray-scale at the starting-point position and the gray-scale at the end-point position is the minimum gray-scale difference (e.g., one gray-scale difference)).

(3) When the starting-point position is other than x=0, the gray-scale variation at the starting-point position and the gray-scale variation at the end-point position are both increase or decrease.

Note that although there are various conditions with which a linear interpolation application area is detected, they have the same purpose that an area on which linear interpolation is performed in order to smooth the gray-scale is determined.

The above-mentioned condition (1) is a condition that in an area where the gray-scale varies from one pixel to another, there is no need to smooth the gray-scale variation in the first place; the condition (2) is a condition with which a decision whether the contour is a normal contour or a contour for which the gray-scale variation should be smoothed is made; and the condition (3) is a condition with which an area where interpolation resulting in a simple increase or simple decrease within the area is performed is determined. Note that in the case of gray-scale data of FIG. 1, the conditions (1) to (3) are satisfied in positions from x=0 to 24.

The detection data shown in FIG. 2(b) is successively judged from the position x=0. Assuming Xs=0 and Xe=14, since this area does not satisfy the condition (2) (neither of gray-scale variations at the starting-point position and the end-point position are a gray-scale variation that should be smoothed), this area is not determined as a linear interpolation application area. The next positions are Xs=14 and Xe=16. Since this area satisfies all the conditions, it becomes a linear interpolation application area. Similarly, when Xs=16 and Xe=24, it becomes a linear interpolation application area.

FIG. 2(c) shows a result obtained by performing linear interpolation processing on an area x=14 to 16 and an area x=16 to 24. The way of processing is similar to that of the previous example explained with FIG. 1. Linear interpolation processing on an area from x=16 to 24 produces the same result as that of FIG. 1(c). With regard to an area x=14 to 16, it is different from the previous example and an interpolation processing result having a steep slope is obtained.

Next, based on results of FIGS. 1 and 2, a process flow in a case where two-dimensional image as shown in FIG. 3(a) is input is shown. FIG. 3(a) shows an image of 26 pixels (horizontal)×6 pixels (vertical). Further, the horizontal and vertical directions are defined as x and y directions respectively, and the direction of the detection/correction processing is assumed to be the x-direction. Lines at y=0, 1, 4 and 5 are the same as those of the input image data of FIG. 1, and lines at y=2 and 3 are the same as those of the input data of FIG. 2.

Although the vertical axis indicates gray-scale values in FIGS. 1 and 2, the gray-scale values are represented by decimal numbers converted from 6-bit values in FIG. 3(a) because it is a two-dimensional image. Note that a gray-scale value of a pixel at coordinates (x, y) is expressed as f(x, y).

FIG. 3(b) shows a detection result of false contour detection and detection of linear interpolation application areas. Either of the detection processing results of the previous two examples shown in FIGS. 1(b) and 2(b) is assigned to each line. Obtained detection points are indicated by while letters in a black background.

FIG. 3(c) shows a result obtained by performing gray-scale extending processing. Since the processing result becomes 8 bits, it is represented by decimal numbers converted from 8-bit values.

A fact that in detection processing performed only in one direction, linear noise occurs in that direction and thus an undesirable gray-scale extending processing result is obtained is explained hereinafter by taking values in the row of x=14 as an example. In FIG. 3(a), values at x=14 are all "13", and thus it has a smooth gray-scale variation with respect to the y-direction. Meanwhile, in FIG. 3(c), values at x=14 are 55, 55, 52, 52, 55 and 55. As can be seen from this, as a result of performing gray-scale extending processing in the x-direction, a gray-scale variation of three gray-scale levels is produced between positions of y=1 and 2 and, similarly, a gray-scale variation of three gray-scale levels is also produced between positions of y=3 and 4 in the values in the row of x=14, which originally had a smooth gray-scale variation. Such a gray-scale variation appears because of the difference of distances of detection points between lines. In FIG. 3, although a gray-scale variation occurs at one pixel (x=14) between an 8-pixel interval (y=0, 1, 4 and 5) and a 2-pixel interval (y=2 and 3), a gray-scale variation continues over eight pixels between a 64-pixel interval and a 16-pixel interval. When a gray-scale variation continues for long in the horizontal direction like this, that portion is recognized as a contour, and as a result it is perceived as horizontal linear noise.

Linear noise perceived in this manner is produced due to the fact that the detection/correction processing is performed only in one direction. In order to suppress such linear noise, it is desirable that similar processing can be also applied in a different direction from the direction in which the above-mentioned detection unit performs detection processing without using a frame buffer.

Specifically, a method in which an output gray-scale value on which gray-scale extending processing was performed is fed back and used as an input signal for the calculation is applied, rather than using linear interpolation or an LPF of a polynomial function. For example, an adjacent gray-scale difference of an image signal on which gray-scale extending processing is not yet performed is compared with an adjacent gray-scale difference of an image signal on which gray-scale extending processing was performed. Then, if the adjacent gray-scale difference after gray-scale extending processing is greater than the adjacent gray-scale difference before gray-scale extending processing (i.e., if the gray-scale variation has become less smooth by the gray-scale extending processing), it is preferable to perform processing to suppress that gray-scale variation within a certain range.

FIG. 4 shows results obtained by performing processing to suppress a gray-scale variation in the y-direction within a certain range when an image as shown in FIG. 3 is input. FIG. 4(a) shows the same input image as that of FIG. 3(a), and FIG. 4(b) shows a result obtained by performing detection/correction processing on the image (the same resulting image as that of FIG. 3(c)). In FIG. 4(b), gray-scale variations in the y-direction in the area of x=14, which are represented by white letters in a black background, satisfy the above-mentioned two conditions (i.e., a gray-scale variation that is originally smooth becomes less smooth by the gray-scale extending processing). Since the area of x=15 has a gray-scale variation of one gray-scale, it is determined to be still smooth.

FIG. 4(c) shows a result obtained by performing feedback calculation as processing to suppress a gray-scale variation within a certain range. For example, assuming that a gray-scale value after gray-scale extending processing is expressed as $F(x, y)$, if a pixel of interest is (14, 2), gray-scale values of the pixel of interest and the adjacent pixel before and after the processing are $f(14,1)=13$, $f(14,2)=13$, $F(14,1)=55$, and $F(14, 2)=52$ respectively. Further, the absolute value of an adjacent gray-scale difference before the gray-scale extending processing is expressed as $|f(14,2)-f(14,1)|=0$, and thus it is a smooth variation. Meanwhile, the absolute value of an adjacent gray-scale difference after the gray-scale extending processing is expressed as $|F(14,2)-F(14,1)|=3$. Therefore, since an adjacent gray-scale variation after the gray-scale extending processing is greater than a gray-scale variation before the gray-scale extending processing, the value of $F(14, 2)$ is set to, for example, $F(14,1)-1=54$ so that this gray-scale variation is suppressed within a certain range. After that, the above-mentioned processing is continued while the position of the pixel of interest is successively shifted in the y-direction by using (feeding-back) the newly obtained value of F.

In FIG. 4(c), which is obtained in this manner, gray-scale variations other than normal contour portions (contours for which the gray-scale variations are not less than two before the gray-scale extending processing) are equal to or less than 1, and thus no linear noise is perceived.

Although different processing methods are applied between the x-direction and the y-direction, i.e., gray-scale extending processing by conventional linear interpolation is applied in the x-direction and gray-scale extending processing based on feedback processing is applied in the y-direction in the above example, it is also possible, needless to say, to apply gray-scale extending processing based on feedback processing in the x-direction.

From the fact described above, the present invention realizes, as means to perform gray-scale extending processing on a digital video signal, appropriate gray-scale extending processing, even though it is using a line memory, by:

(1) including a detection unit that detects an area to which an area where a gray-scale variation should be smoothed by performing gray-scale extending processing is applied, and a extension correction unit that performs gray-scale extending processing on a detected gray-scale extending processing application area; and (2) feeding back an output pixel row on which gray-scale extending processing was performed and using the fed back output pixel row as an input signal in the detection unit.

In accordance with the above-mentioned method, by applying it to an apparatus, a method, or a program described below, gray-scale extending processing capable of properly preventing false contours can be performed with low costs.

Firstly, as an image processing device, it detects a gray-scale extending processing application area of image data by the above-mentioned detection technique and performs gray-scale extension based on the detection result, so that it can perform gray-scale extending processing capable of properly preventing false contours with low costs, and thus enabling the image to be reproduced with high image quality.

Note that it is possible to select a device, a program, or other methods for each of the detection processing and the gray-scale extending processing to perform the respective processing. For example, the detection processing may be performed by an image detection device, and the gray-scale extending processing may be performed by a gray-scale extending processing program. In this way, the examples include an image processing method and an image processing program as a derivative embodiment of an image processing device, and an image detection device, an image detection method, and image detection program in which only the detection processing is extracted.

Further, as a display device, it can display a high-quality image by displaying an image obtained by processing the image data by the above-mentioned technique.

Preferable exemplary embodiments in accordance with the present invention based on the above-mentioned principle are explained hereinafter.

First Exemplary Embodiment

FIG. 5 shows a configuration of an image processing device in accordance with a first exemplary embodiment on which the present invention is implemented in a preferably manner. This image processing device is a specific device that performs processing based on the above-mentioned principle of the present invention.

An image processing device in accordance with this exemplary embodiment includes a detection unit 11, an extension correction unit 12, and line buffers 13a and 13b. Six-bit image data is successively input to the image processing device. The image processing device converts this 6-bit image data into 8-bit image data, and outputs the converted data to a display device or the like.

The detection unit 11 detects an area to which an area where the gray-scale variation should be smoothed is applied by successively scanning pixel rows of the input 6-bit image data and the 8-bit image data to be output.

Further, while the detection unit 11 successively scans the gray-scale values of pixel rows of the input image data, if the detection unit 11 detects a gray-scale variation in the y-direction within a certain range (e.g., the minimum gray-scale difference), it determines a correction amount such that the gray-scale variation of the gray-scale values of the output image data located in the same position falls within a certain range. With regard to a correction amount in the x-direction, an area to which an area where the gray-scale variation should be smoothed based on linear correction is applied is detected.

Note that although correction in the x-direction is based on linear correction in this exemplary embodiment, needless to say, a similar method to the correction in the y-direction may be also applied.

The line buffers 13 include a line buffer 13a that accumulates input 6-bit image data equivalent to one line while the detection processing is being performed by the detection unit 11, and a line buffer 13b that accumulates 8-bit image data equivalent to one line, which is output image data corresponding to that input image data.

The extension correction unit 12 performs gray-scale extending processing by using a correction amount obtained in the detection unit 11.

In accordance with this exemplary embodiment, by equipping the image processing device with line buffers 13, extension correction in a direction (y-direction) perpendicular to the scanning direction (x-direction) of an image, along which the raster scan is performed, is performed on an image located in an appropriate position.

Note that although a block configuration to perform processing for one color is shown in this example, in the case where an RGB color image is to be processed, similar configurations may be arranged in parallel for the respective color components. This holds true for other exemplary embodiments.

Specific configurations and operations of the detection unit 11 are explained. As shown in FIG. 6, the detection unit 11 includes a decision output unit 21, a starting-point parameter retention unit 22, and a counter 23. The counter 23 is used to grasp at which position in order the successively-input image data is located in a relative fashion. Therefore, if the position of input image data can be located, the use of the counter 23 is not necessarily indispensable. The starting-point parameter retention unit 22 retains a starting-point position Xs, a starting-point gray-scale Ts, and a starting-point gray-scale variation amount FCs, which are parameters necessary for decision processing in the decision output unit 21. These parameters are changed when a detection point is detected in the decision output unit 21.

Note that the gray-scale variation amount FC is information that indicates whether a detected gray-scale variation is an incremental gray-scale variation or a decremental gray-scale variation and whether the gray-scale variation is a gray-scale variation for which linear interpolation processing should be performed or a gray-scale variation of a contour portion for which linear interpolation processing should not be performed.

Specifically, the gray-scale variation amount FC takes one of the following values:

FC=00 . . . a gray-scale variation for which linear interpolation processing should be performed and which is an incremental gray-scale variation;

FC=01 . . . a gray-scale variation for which linear interpolation processing should be performed and which is a decremental gray-scale variation; and FC=10 . . . a gray-scale variation of a contour portion for which linear interpolation processing should not be performed.

The decision output unit 21 makes following decisions based on an input image In(x, y) (where (x, y) represents the position of the successively-input image, and In(x, y) represents a gray-scale at the position (x, y)), and a parameter and a threshold TH retained in the starting-point parameter retention unit 22.

For detection in the x-direction, firstly, it is determined whether the condition of an item (1-1) shown below is satisfied or not, and if it is satisfied, that processing is performed. If the condition of the item (1-1) is not satisfied, it is determined whether the condition of an item (1-2) shown below is satisfied or not, and if it is satisfied, that processing is performed. If neither of the conditions of the items (1-1) and (1-2) are satisfied, the processing of an item (1-3) shown below is performed.

(1-1): If In(x, y)=Ts (a starting-point gray-scale is equal to the gray-scale of an input image), this position is not regarded as a detection point. (No processing is performed. The output is also not changed.)

(1-2): If the condition of the item (1-1) is not satisfied and Ts−TH<In(x, y)<Ts+TH and In(x+1,y)=In(x, y) (the gray-scale variation of an input image falls within a range of starting-point gray-scale±threshold, and a gray-scale variation at a position x+1 is equal to a gray-scale variation at a position x), this position is detected as a linear interpolation application area on which linear interpolation processing is to be performed. At this state, the parameters are set as: output position X=x; and with regard to the output gray-scale variation amount FC, when Ts<In(x, y), FC=00, and when Ts>In(x, y), FC=01. Further, the parameters Xs, Ts, and FCs retained in the starting-point parameter retention unit 22 are changed to x, In(x, y), and FC respectively, and they are used in the next and subsequent processing.

(1-3): If the condition of the item (1-2) is not satisfied, this position is detected as a contour portion. The parameters are set as: output position X=x; and output gray-scale variation amount FC=10. Further, similarly to the item (1-2), the parameters Xs, Ts, and FCs retained in the starting-point parameter retention unit 22 are changed to x, In(x, y), and FC respectively, and they are used in the next and subsequent processing.

After the detection in the x-direction, detection in the y-direction is performed. For the detection in the y-direction, firstly, it is determined whether the condition of an item (2-1) shown below is satisfied or not, and if it is satisfied, that processing is performed. Further, if the condition of the item (2-1) is not satisfied, the processing of an item (2-2) shown below is performed.

(2-1): If the absolute value of In(x, y)−In(x, y−1) is smaller than a threshold TH2, this position is an area in which the gray-scale should varies smoothly and detected as a position on which feedback processing is to be performed. Correction amounts to be transmitted to the extension correction unit 12 are In(x, y)−In(x, y−1) and Out2(x, y−1).

(2-2): If the condition of the item (2-1) is not satisfied, this position is not regarded as a detection point (No processing is performed. The output is also not changed).

As described above, in the detection unit 11, with respect to the x-direction, pixel rows of a digital video signal are successively scanned, and detection points on which linear interpolation processing are to be performed and the other detection points are detected separately. Further, with respect to the y-direction, detection points on which feedback processing are to be performed and the other detection points are divided from each other.

Note that the thresholds TH and TH2 are thresholds that are used to determine whether a gray-scale variation at a detection point is smoothed by correction or left unchanged. As for their values, appropriate values may be set depending on the details of the processing or characteristics of the input image. As a simplest way, they may be set as TH=2 and TH2=2 so that only the minimum gray-scale difference is smoothed by correction. Further, when the minimum gray-scale difference of an input image (e.g., equivalent to one screen) is 2, it is possible to determine an area having the minimum gray-scale difference as an area for which the gray-scale variation should be smoothed, and therefore the values are set as TH=3 and TH2=3.

Next, specific configurations and operations of the extension correction unit 12 are explained.

FIG. 7 shows a configuration of an extension correction unit 12. The extension correction unit 12 includes a correction processing unit (x-direction) 24, a correction processing unit (y-direction) 25, a parameter extraction unit 26, and a parameter buffer 27.

The parameter buffer 27 accumulates a detection position X and a gray-scale variation amount FC equivalent to one line obtained in the detection unit 11. The parameter extraction unit 26 acquires Xs and Xe satisfying Xs≦x<Xe, and gray-scale variation amounts FCs and FCe located at those positions from the parameter buffer 27 according to a pixel position x of an image input to the correction processing unit (x-direction) 24.

FIG. 8 shows an internal configuration of the extension correction unit 12 to perform correction processing in the x-direction. The correction processing unit (x-direction) 24 receives an image In(x, y), performs gray-scale extension correction processing based on this input value, and Xs, Xe, FCs and FCe transmitted from the parameter extraction unit 26, and outputs the processing result Out(x, y). The content of the gray-scale extension correction processing is selected from the following five processing items according to the values of FCs and FCe.

(1) If FCs=00 and FCe=01, $$Out(x,y)=4\times[In(Xs,y)-(In(Xe,y)-In(Xs,y))/2\times\{1-abs(x\times2-Xs-Xe)/(Xe-Xs)\}].$$

(2) If the condition of the item (1) is not satisfied and FCs=01 and FCe=00, $$Out(x,y)=4\times[In(Xe,y)-(In(Xe,y)-In(Xs,y))/2\times\{1-abs(x\times2-Xs-Xe)/(Xe-Xs)\}].$$

(3) If the condition of the item (2) is not satisfied and FCs is not equal to 01 and FCe=00, $$Out(x,y)=4\times[In(Xs,y)+(In(Xe,y)-In(Xs,y))\times(x-Xs)/(Xe-Xs)].$$

(4) If the condition of the item (3) is not satisfied and FCs=01 and FCe is not equal to 00, $$Out(x,y)=4\times[In(Xs-1,y)+(In(Xs,y)-In(Xs-1,y))\times(x-Xs)/(Xe-Xs)].$$

(5) If neither of the items (1) to (4) are satisfied, $$Out(x,y)=4\times In(x,y).$$

Note that the all digits to the right of the decimal point are discarded.

The items (1) to (4) are linear interpolation processing. In particular, the items (1) and (2) are linear interpolation processing in which the gray-scale variation is in a convex portion and a concave portion, and the items (3) and (4) are similar linear interpolation processing to that in the related art. The item (5) is processing to add a fixed gray-scale value, and used for a detection point on which linear interpolation processing is not performed.

Although the above-mentioned correction processing is used in this exemplary embodiment, it is not limited to such processing. For example, only the items (3) and (4) may be used, or other calculating formulas may be used.

FIG. 9 shows an internal configuration of an extension correction unit 12 to perform correction processing in the y-direction.

Out(x, y) obtained in the correction processing unit (x-direction) 24 is an 8-bit value, and it is transmitted to the correction processing unit (y-direction) 25. The correction processing unit (y-direction) 25 compares, by using a gray-scale value of an image signal on which gray-scale extending processing in the y-direction was performed, an adjacent gray-scale difference of an image signal on which gray-scale extending processing is not yet performed with an adjacent gray-scale difference of an image signal on which gray-scale extending processing was performed. Then, if the adjacent gray-scale difference after the gray-scale extending processing is greater than the adjacent gray-scale difference before the gray-scale extending processing, the correction processing unit (y-direction) 25 performs processing to suppress that gray-scale variation within a certain range.

Specifically, (1): if In(x, y)−TH2<In(x,y−1)<In(x, y)+TH2 and |In(x, y)−In(x,y−1)|<|Out(x, y)−Out2(x, y−1)| (a gray-scale variation of input image data is smaller than a threshold TH2, and the absolute value of a gray-scale variation of a gray-scale value of output image data located in the same position is greater than the absolute value of a gray-scale variation of a gray-scale value of the input image data), it is set, for example, as $$Out2(x,y)=Out2(x,y-1)+In(x,y)-In(x,y-1).$$

Further, in any other cases, it is set as $$Out2(x,y)=Out(x,y).$$

As described above, an image processing device in accordance with this exemplary embodiment includes a detection unit 11 that detects an area for which the gray-scale variation is to be smoothed and an extension correction unit 12 that performs gray-scale extension based on the detection result, and thereby realizing appropriate gray-scale extending processing with low costs.

Note that correction processing is not limited to the above-mentioned formulas, and a correction value may be determined according to a difference between a gray-scale variation of a gray-scale value of output image data and a gray-scale variation of a gray-scale value of input image data. Further, the following functions/configurations may be incorporated in order to obtain other advantageous effects.

(1) As a configuration of the correction processing unit (y-direction) 25, a maximum acceptable value for a cumulative error is defined, and if the cumulative error exceeds that value, the correction processing is not performed. Specifically, if the value of Out(x, y)−Out2(x, y) becomes greater than or equal to a certain value, it is set as Out2(x, y)=Out(x, y) regardless of the value of In(x, y). This configuration prevents the accumulation of errors due to the feedback processing, and thereby is effective in preventing degradation in images.

(2) As a configuration of the correction processing unit (y-direction) 25, a gray-scale variation by the correction processing is made smaller in a boundary area where execution/non-execution of correction processing is changed than that of areas other than the boundary area. Specifically, if Out2(x, y−1)=Out(x, y−1) and Out2(x, y) is not equal to Out(x, y), or Out2(x, y−1) is not equal to Out(x, y−1) and Out2(x, y)=Out(x, y), processing to make a gray-scale variation by the correction processing smaller than a certain value is incorporated. This configuration is effective in preventing such a situation that a Mack band tends to occur in a boundary portion due to the execution/non-execution of correction processing.

(3) As another configuration of an image processing device, an image processing unit such as γ-correction processing is further provided, so that an input pixel row on which image processing is not yet performed, a pixel row on which image processing was performed, and an output pixel row on which gray-scale extending processing was performed can be used as inputs to the detection unit. This configuration is effective in suppressing increase in quantization error that occurs due to the digital image processing.

In an image processing device in accordance with this exemplary embodiment, detection position data and a correction amount in the detection position are determined in the detection unit 11, and correction processing is performed based on that data in the extension correction unit 12. However, distribution/unification of this processing can be changed as appropriate. For example, it may be modified such that the detection unit 11 performs processing up to the generation of a correction bit(s) (a value obtained by subtracting an input image gray-scale from a processing result performed by the correction processing unit (x-direction) 24 and the correction processing unit (y-direction) 25 in this exemplary embodiment), and then the extension correction unit 12 performs only the gray-scale addition processing.

As described above, an image processing device in accordance with this exemplary embodiment can perform appropriate gray-scale extending processing by using a limited line buffer(s) even in cases where a frame buffer cannot be used in terms of its cost or the like because of its large scale.

Second Exemplary Embodiment

Second exemplary embodiment on which the present invention is implemented in a preferably manner is explained. FIG. 10 shows a configuration of a display device in accordance with this exemplary embodiment. This display device includes a detection unit 41, an extension correction unit 42, line buffers 43a and 43b, and an image display unit 45. It has a substantially similar configuration to that of the image processing device in accordance with the first exemplary embodiment except that it further includes the image display unit 45. The detection unit 41 performs detection processing by using an 8-bit raster image transmitted from a computer or the like and image data output from the extension correction unit 42. The line buffers 43a and 43b accumulate image data equivalent to one line before and after extension correction is performed. The extension correction unit 42 performs gray-scale extending processing to 10 bits based on a correction amount transmitted from the detection unit 41. The image display unit 45 is a display device capable of displaying a 10-bit image.

The detection unit 41, the extension correction unit 42, and the line buffers 43a and 43b forms an image processing unit in this exemplary embodiment.

The line buffers 43a and 43b preferably have a buffer size equivalent to one line in the x-direction of the image display unit 45 because image data is successively processed in an amount equivalent to one line in the main scanning direction of the display device at a time. Publicly-known display devices such as LCDs, PDPs, ELs, and CRTs are applicable as the image display unit 45.

A display device in accordance with this exemplary embodiment can perform appropriate gray-scale extending processing, suppress the occurrence of false contours, and provide higher-quality images even in the case where the number of bits of an input image is smaller than the number of bits the image display unit 45 can display.

Note that although this exemplary embodiment is explained by using an example in which the gray-scale of 8-bit image data is extended to 10 bits, the detection/gray-scale extending processing is similar to that of the image processing device in accordance with the first exemplary embodiment in which the gray-scale of a 6-bit input image data is extended to 8 bits.

Third Exemplary Embodiment

Third exemplary embodiment on which the present invention is implemented in a preferably manner is explained. As shown in FIG. 11, a detection unit 11 and an extension correction unit 12 similar to those of the image processing device in accordance with the first exemplary embodiment are constructed by software processing by a substantial computer (CPU 31).

FIGS. 12 to 15 show flows of image processing by an image processing device in accordance with this exemplary embodiment. These operations are similar to those of the image processing device in accordance with the first exemplary embodiment, but realized by software processing by the CPU 31, in which detection processing is performed on an input 6-bit raster image and extension processing to 8 bits is performed based on the detection result. The processing from the steps S2 to S12 corresponds to the processing of the detection unit 11 with respect to the x-direction in the first exemplary embodiment (hereinafter called "first image processing"). Further, the processing from the steps S13 to S28 corresponds to the processing of the extension correction unit 12 with respect to the x-direction in the first exemplary embodiment (hereinafter called "second image processing"). Furthermore, the processing from the steps S29 to S32 corresponds to the processing of the extension correction unit 12 with respect to the y-direction in the first exemplary embodiment (hereinafter called "third image processing").

FIG. 12 shows a flow of the first image processing. Further, FIGS. 13 and 14 show flows of the second image processing. Furthermore, FIG. 15 shows a flow of the third image processing. These processing steps are performed by having a control unit (CPU 31 or the like), which controls a computer, extend a program stored in a ROM or an information recording medium (not shown) on the RAM and execute it, and by doing so, having the CPU 31 function as the detection unit 11 and the extension correction unit 12.

Step S1: When input image data In (6 bits), which is a raster image, is input, the CPU 31 extracts information indicating which pixel the input image signal belongs to (i.e., the y-value of the pixel). Note that the In(x, y) indicates a gray-scale value.

Step S2: The CPU 31 initializes the input signal position x0 as x0=0 and acquires a predetermined data length Xmax in the x-direction in order to perform detection/correction processing on image data on that line based on the Y-coordinate of the pixel.

Step S3: Before performing detection processing, the CPU 31 defines parameters such that starting-point position Xs=0, starting-point gray-scale Ts=In(0, y), pre-starting-point gray-scale Ts0=In(0, y), starting-point gray-scale variation amount FCs=10, and threshold TH=2 (step S3).

After the initial conditions are set, the CPU 31 performs actual detection processing in the following procedure.

Step S4: the CPU 31 increments the input signal position x0 by one.

Step S5: the CPU 31 compares x0 with Xmax. If the value of x0 is equal to Xmax, the gray-scale variation detection processing is terminated and it proceeds to a step S7 (step S5/Yes). If not so (if the value of x0 is not equal to Xmax), it proceeds to the gray-scale variation detection processing (step S5/No).

(Gray-Scale Variation Detection Processing)

Step S6: The CPU 31 compares gray-scale data In(x0, y) located in the position x0 with the starting-point gray-scale Ts. If In(x0, y) is equal to Ts (the same gray-scale continues), it returns to the step S4 and detection of a gray-scale variation is continued (step S6/Yes). If not so (step S6/No), it is regarded as a gray-scale variation point and it proceeds to a step S7.

Step S7: The CPU 31 retains the end-point position Xe=x0 and the end-point gray-scale Te=In(x0, y).

(Detection Point Variation Amount Setting Processing)

Step S8: The CPU 31 determines whether the current extension correction signal position is a linear interpolation application area or not. If Ts−TH<In(x0, y)<Ts+TH and (x0+

$1, y)=\text{In}(x0, y)$, it proceeds to a step S9 (step S8/Yes). If not so, it proceeds to a step S10 (step S8/No).

Step S9: The CPU 31 determines whether a gray-scale variation in the current extension correction signal position, which is a linear interpolation application area, is increment or decrement. It compares In(x0, y) with Ts, and if In(x0, y)>Ts, it proceeds to a step S11 (step S9/Yes). If In(x0, y)≦Ts, it proceeds to a step S12 (step S9/No).

Step S10: The CPU 31 sets the end-point gray-scale variation amount FCe to 10 (it is not a linear interpolation application area), and proceeds to the second image processing.

Step S11: The CPU 31 sets the end-point gray-scale variation amount FCe to 00 (it is a linear interpolation application area and the gray-scale variation is increment), and proceeds to the second image processing.

Step S12: The CPU 31 sets the end-point gray-scale variation amount FCe to 01 (it is a linear interpolation application area and the gray-scale variation is decrement), and proceeds to the second image processing.

After that, the CPU 31 performs the second image processing (gray-scale extension processing) in the following flow by using respective parameters obtained up to the step S12.

Step S13: The CPU 31 sets the signal position for extension correction x to Xs.

(Gray-Scale Content Decision Processing)

Steps S14 to S17: The CPU 31 determines gray-scale extending processing to be applied based on the values of the starting-point gray-scale variation amount FCs and the end-point gray-scale variation amount FCe. The content of the gray-scale extending processing is determined in the following procedure.

(1): If FCs=00 and FCe=01, the CPU 31 determines that the gray-scale extending processing of a step S18 should be applied (step S14).

(2): If the condition of the item (1) is not satisfied, and FCs=01 and FCe=00, the CPU 31 determines that the gray-scale extending processing of a step S19 should be applied (step S15).

(3): If the condition of the item (2) is not satisfied and FCe=00, the CPU 31 determines that the gray-scale extending processing of a step S20 should be applied (step S16).

(4): If the condition of the item (3) is not satisfied and FCs=01, the CPU 31 determines that the gray-scale extending processing of a step S21 should be applied (step S17).

(5): If the condition of the item (4) is not satisfied, the CPU 31 performs the processing of a step S22 (step S17).

(Gray-Scale Extension Processing)

Steps S18 to S22: The CPU 31 performs one of the gray-scale extending processing items shown below in accordance with the result selected in the steps S14 to S17 by using a starting-point position Xs, a starting-point gray-scale Ts, a pre-starting-point gray-scale TS0, an end-point position Xe, an end-point gray-scale Te, an extension correction signal position x, and an input video signal.

(1): Step S18

$\text{Out}(x,y)=4\times[Ts-(Te-Ts)/2\times\{1-abs(x\times 2-Xs-Xe)/(Xe-Xs)\}]$ (2): Step S19

$\text{Out}(x,y)=4\times[Te-(Te-Ts)/2\times\{1-abs(x\times 2-Xs-Xe)/(Xe-Xs)\}]$ (3): Step S20

$\text{Out}(x,y)=4\times[Ts+(Te-Ts)\times(x-Xs)/(Xe-Xs)]$ (4): Step S21

$\text{Out}(x,y)=4\times[Ts0+(Ts-Ts0)\times(x-Xs)/(Xe-Xs)]$ (5): Step S22 (linear interpolation processing is not performed)

$\text{Out}(x,y)=4\times\text{In}(x,y)$

After the gray-scale extending processing has completed, it proceeds to a step S23.

Step S23: The CPU 31 increments the extension correction signal position x by one.

Step S24: The CPU 31 compares the value of x with Xe. If x<Xe, it returns to the step S14 and the gray-scale extending processing is repeated by using the same parameters Xs, Ts, Ts0, Xe and Te (step S24/Yes). If x≧Xe, the gray-scale extending processing is terminated (step S24/No).

Step S25: The CPU 31 compares x0 with Xmax. If x0=Xmax, that means that the gray-scale extending processing has been performed on all the input signals (x, y), each of which is equivalent to one line, from x=0 to Xmax, and therefore it proceeds to a step S28 (step S25/Yes). If not so, it proceeds to a step S26 to continue the processing on the remaining input signals (step S25/No).

Step S26: The CPU 31 substitutes Ts for the pre-starting-point gray-scale Ts0.

Step S27: The CPU 31 substitute Xe, Te, and FCe for the starting-point position Xs, the starting-point gray-scale Ts, and the starting-point gray-scale variation amount FCs respectively, and proceeds to the step S4 in order to start the detection processing again.

Step S28: The CPU 31 transmits output image data Out(x, y) (8 bits) for the third image processing.

Step S29: The CPU 31 determines whether or not the gray-scale variation of input image data is smaller than TH2 and the gray-scale variation of a gray-scale value of output image data located in the same position is greater than the gray-scale variation of a gray-scale value of the input image data. If $\text{In}(x, y)-TH2<\text{In}(x, y-1)<\text{In}(x, y)+TH2$ and $abs\{\text{In}(x, y)-\text{In}(x, y-1)\}<abs\{\text{Out}(x, y)-\text{Out2}(x, y-1)\}$, it proceeds to a step S30 (step S29/Yes). If not so, it proceeds to a step S31 (step S29/No).

The CPU 31 performs one of the following processing items in accordance with the result in the step S29.

(1): Step S30

$\text{Out2}(x,y)=\text{Out2}(x,y-1)+\text{In}(x,y)-\text{In}(x,y-1)$ (2): Step S31

$\text{Out2}(x,y)=\text{Out}(x,y)$

Step S32: The CPU 31 outputs output image data Out2(x, y) (8 bits) obtained in a manner described above.

By adopting software processing by a computer for the processing from the steps S2 to S12, which corresponds to the processing with respect to the x-direction in the detection unit 11 in the first exemplary embodiment (first image processing), the processing from the steps S13 to S28, which corresponds to the processing with respect to the x-direction in the extension correction unit 12 in the first exemplary embodiment (second image processing), and the processing from the steps S29 to S32, which corresponds to the processing with respect to the y-direction in the detection unit 11 and the extension correction unit 12 in the first exemplary embodiment (third image processing), an image processing method similar to the image processing device in accordance with the above-described first exemplary embodiment can be performed without using special hardware.

Note that although flowcharts in FIGS. 12 to 15 are shown to perform image processing similar to the image processing device in accordance with the above-described first exemplary embodiment of the present invention, image processing similar to the image processing unit of the display device in accordance with the above-described second exemplary embodiment of the present invention can be also performed by software processing using a computer.

Further, in the third exemplary embodiment, software processing using a computer in an image processing device is explained. However, needless to say, detection processing and gray-scale extending processing similar to the image detection device and the gray-scale extension device can be also realized by software processing using a computer.

Although each of above-described exemplary embodiments is explained with an assumption that the number of gray-scale extension bits is a fixed quantity, it does not means that only the values explained above can be used, and they are applicable to any given number of gray-scale extension bits.

Note that each of above-described exemplary embodiments is merely an example of preferable embodiments of the present invention, and the present invention is not limited to them.

For example, although each of above-described exemplary embodiments is explained by using an example where incremental amounts of data for respective colors are the same in the gray-scale extending processing, they do not necessarily have to be the same value. For example, when R, G, and B have five bits, six bits, and five bits respectively, each of the RGB can have an 8-bit output by extending the gray-scales of R, G, and B by three bits, two bits, and three bits respectively.

Further, it may be also configured such that the data amount is increased only for some color(s) of the RGB. Further, the raster image does not necessarily have to be a color image composed of multi-color image signal, and may be a monochrome image.

As described above, various modifications can be made in the present invention.

BRIEF DESCRIPTION OF DRAWINGS

FIG. 3A shows an example of detection processing and linear interpolation processing in gray-scale extending processing in the x-direction performed on a two-dimensional image that is formed based on one-dimensional gradation image;

FIG. 3B shows an example of detection processing and linear interpolation processing in gray-scale extending processing in the x-direction performed on a two-dimensional image that is formed based on one-dimensional gradation image;

FIG. 3C shows an example of detection processing and linear interpolation processing in gray-scale extending processing in the x-direction performed on a two-dimensional image that is formed based on one-dimensional gradation image;

FIG. 4A shows an example of gray-scale extending processing in accordance with the present invention in which feedback processing is performed in the y-direction of a two-dimensional image;

FIG. 4B shows an example of gray-scale extending processing in accordance with the present invention in which feedback processing is performed in the y-direction of a two-dimensional image;

FIG. 4C shows an example of gray-scale extending processing in accordance with the present invention in which feedback processing is performed in the y-direction of a two-dimensional image;

Figure 1A:
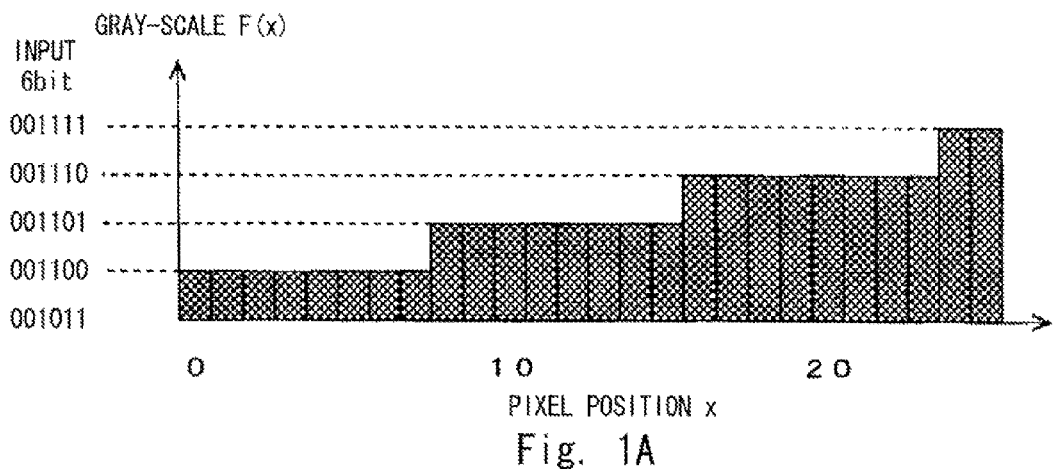
FIG. 1A shows an example of detection processing and linear interpolation processing in gray-scale extending processing performed on a gradation image.
Figure 1B:
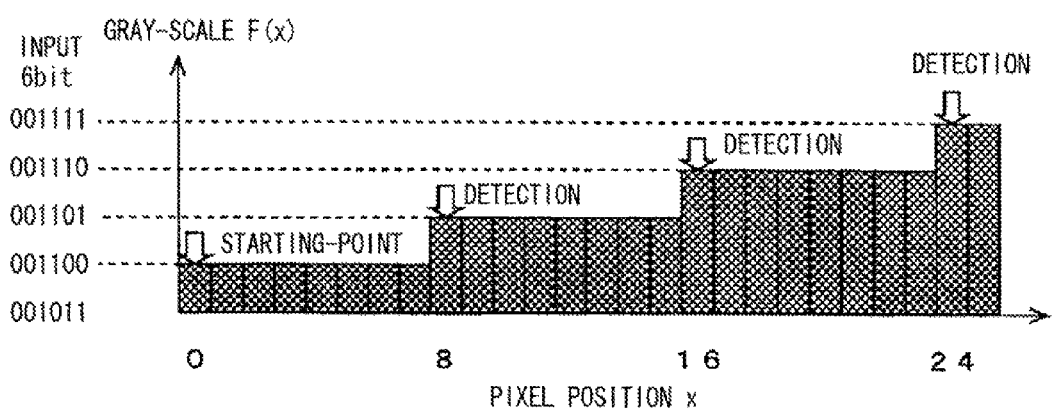
FIG. 1B shows an example of detection processing and linear interpolation processing in gray-scale extending processing performed on a gradation image.
Figure 1C:
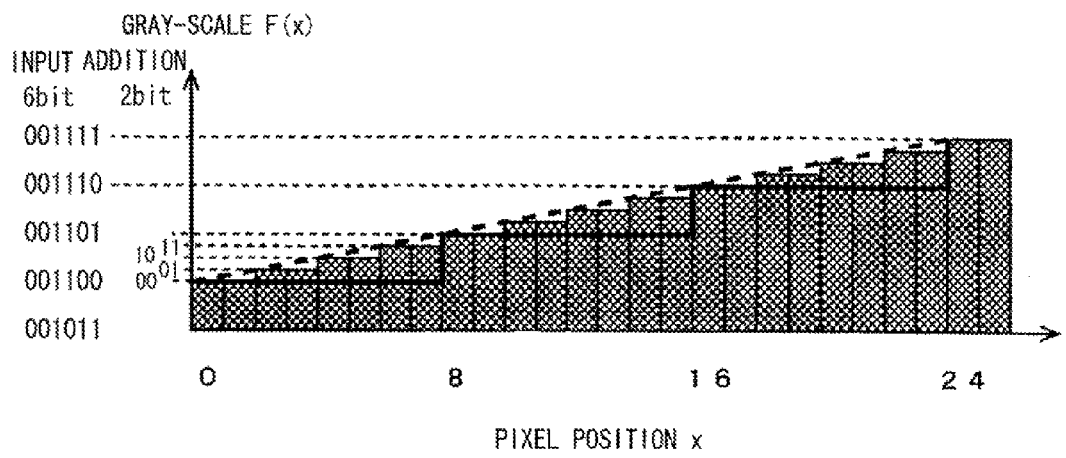
FIG. 1C shows an example of detection processing and linear interpolation processing in gray-scale extending processing performed on a gradation image.
Figure 2A:
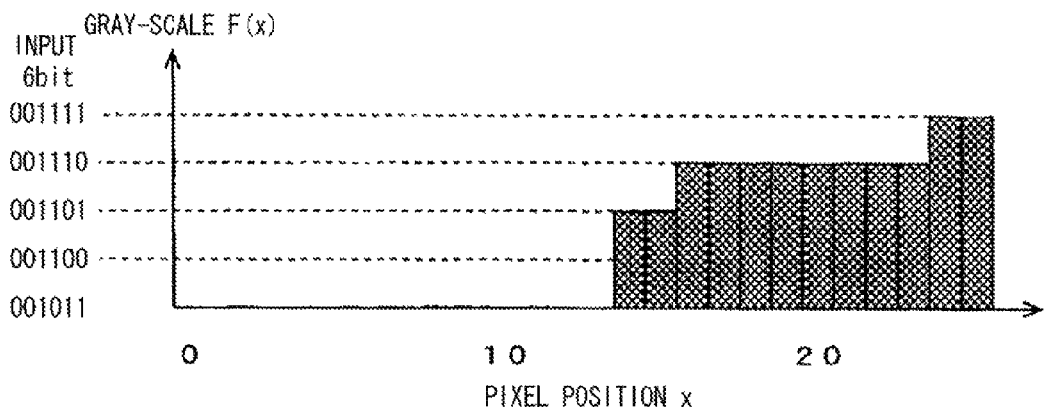
FIG. 2A shows another example of detection processing and linear interpolation processing in gray-scale extending processing performed on a gradation image.
Figure 2B:
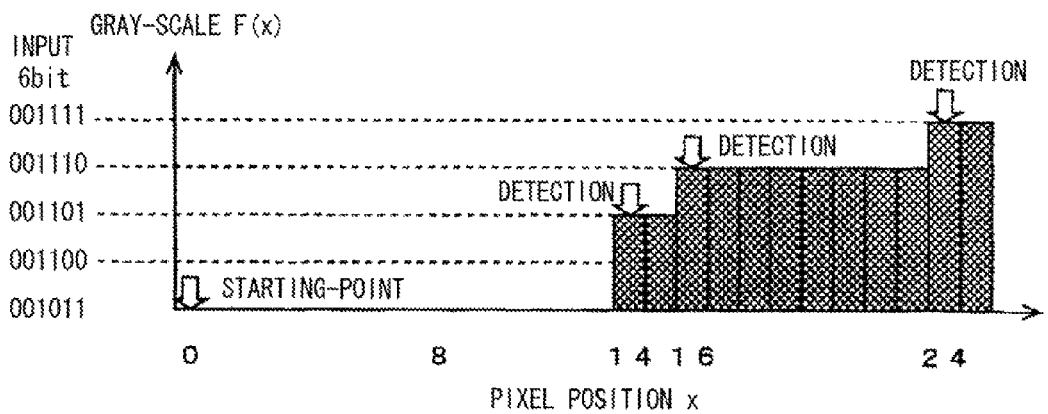
FIG. 2B shows another example of detection processing and linear interpolation processing in gray-scale extending processing performed on a gradation image.
Figure 2C:
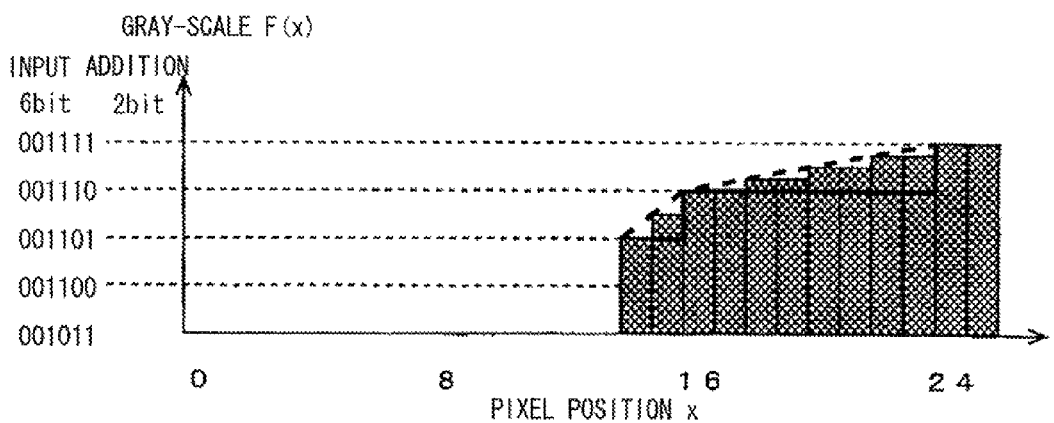
FIG. 2C shows another example of detection processing and linear interpolation processing in gray-scale extending processing performed on a gradation image.
Figure 5:
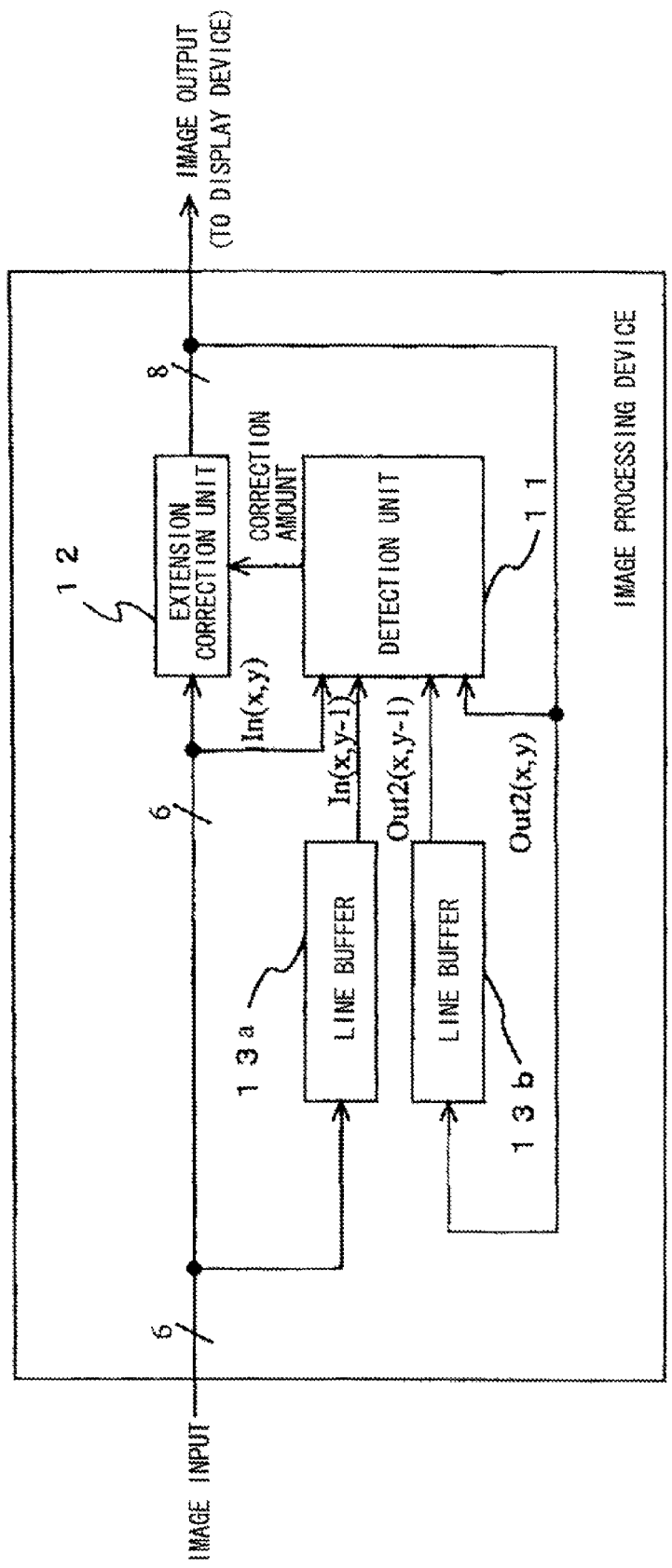
FIG. 5 shows a configuration of an image processing device in accordance with a first exemplary embodiment on which the present invention is implemented in a preferably manner.
Figure 6:
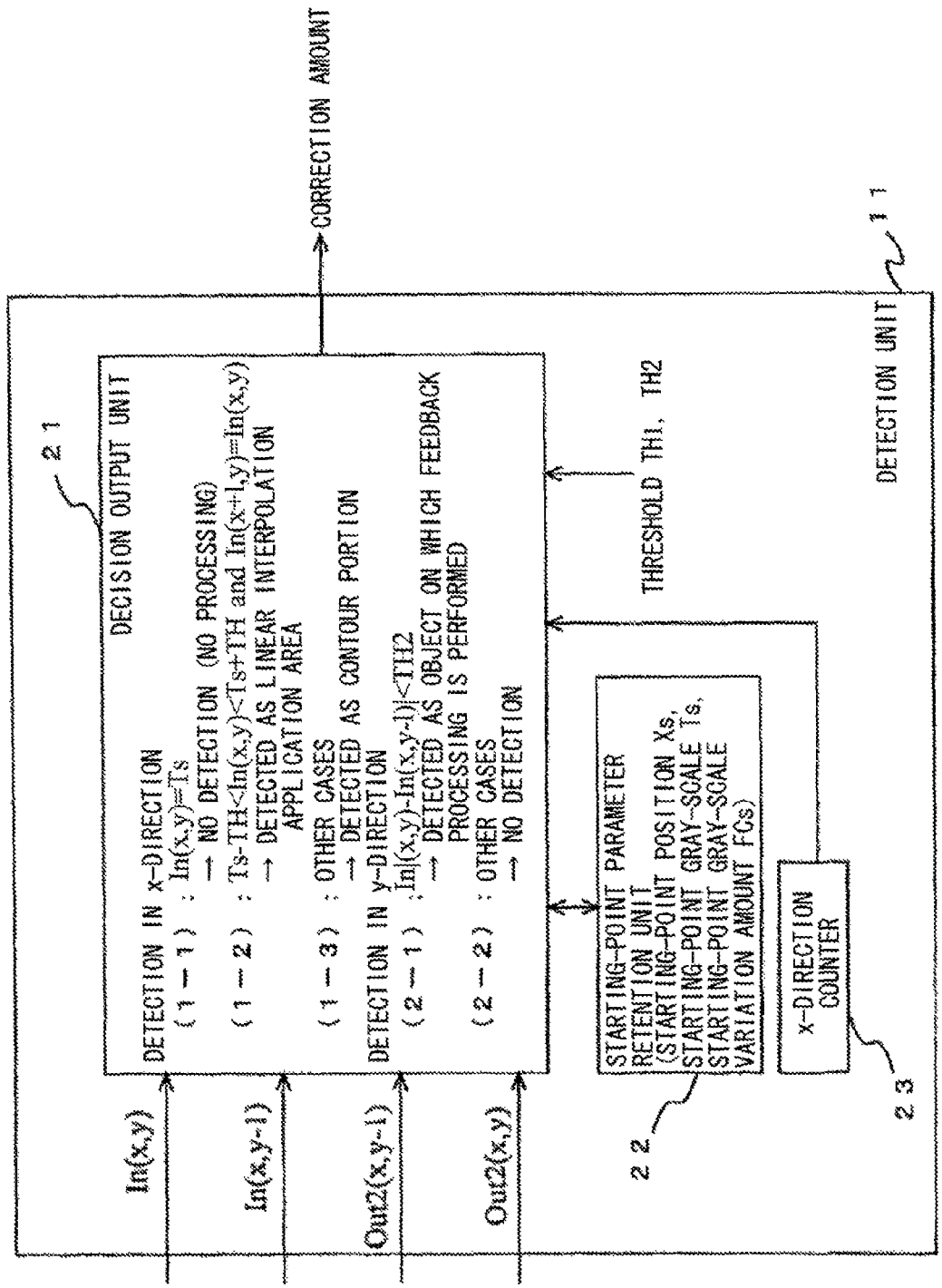
FIG. 6 shows a configuration of a detection unit of an image processing device in accordance with a first exemplary embodiment.
Figure 7:
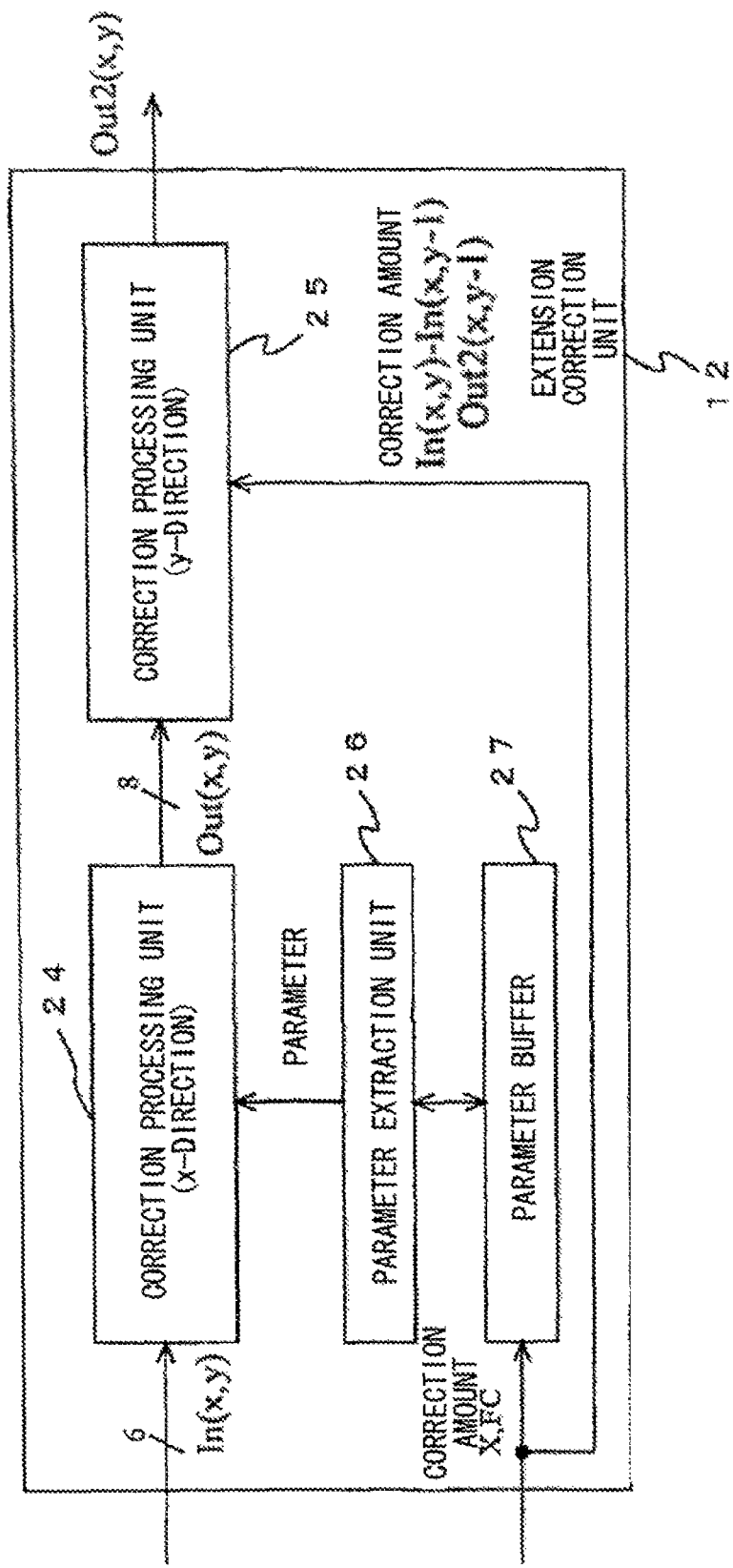
FIG. 7 shows a configuration of an extension correction unit of an image processing device in accordance with a first exemplary embodiment.
Figure 8:
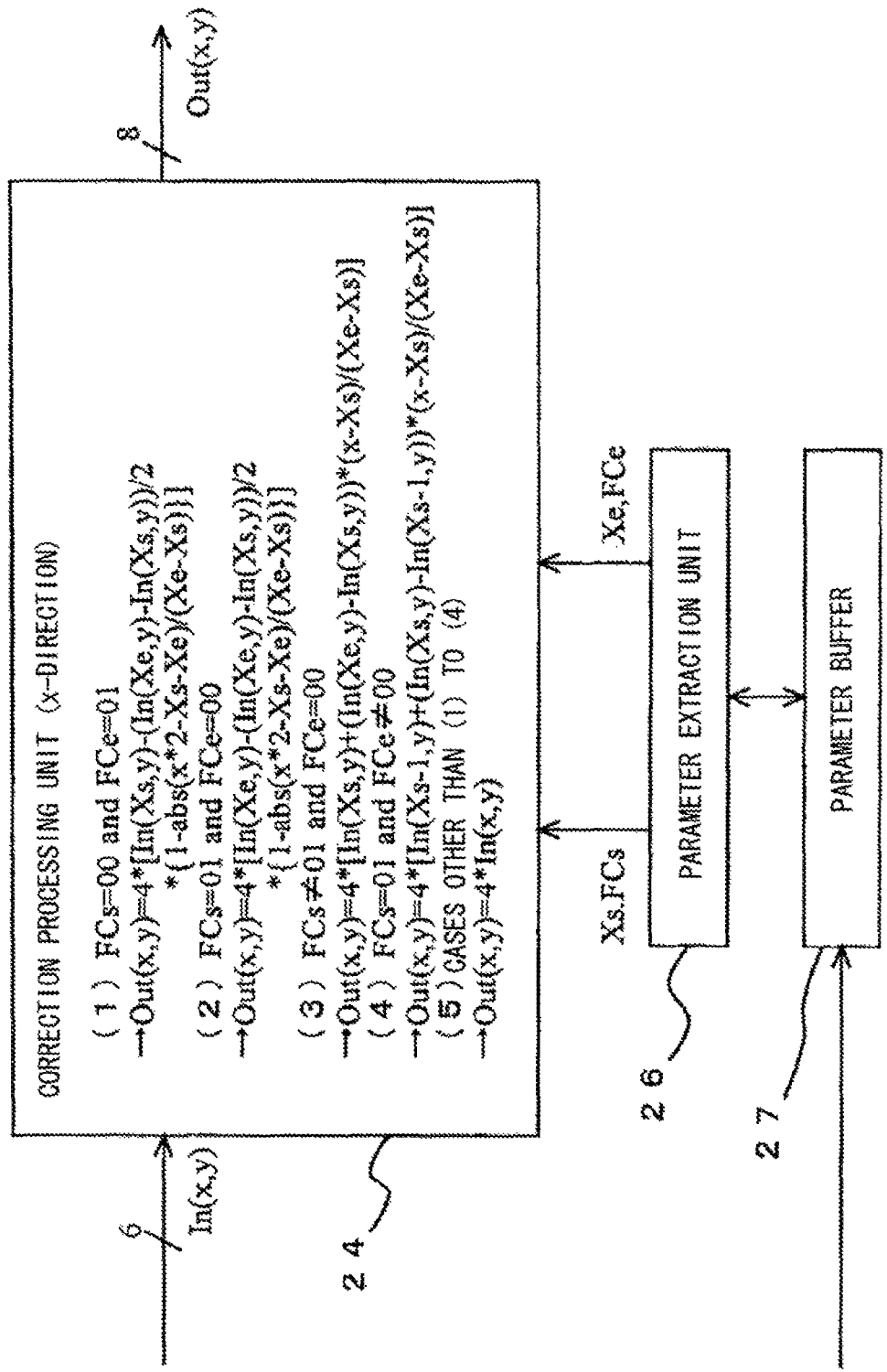
FIG. 8 shows a configuration of an extension correction unit to perform gray-scale extending processing in the x-direction.
Figure 9:
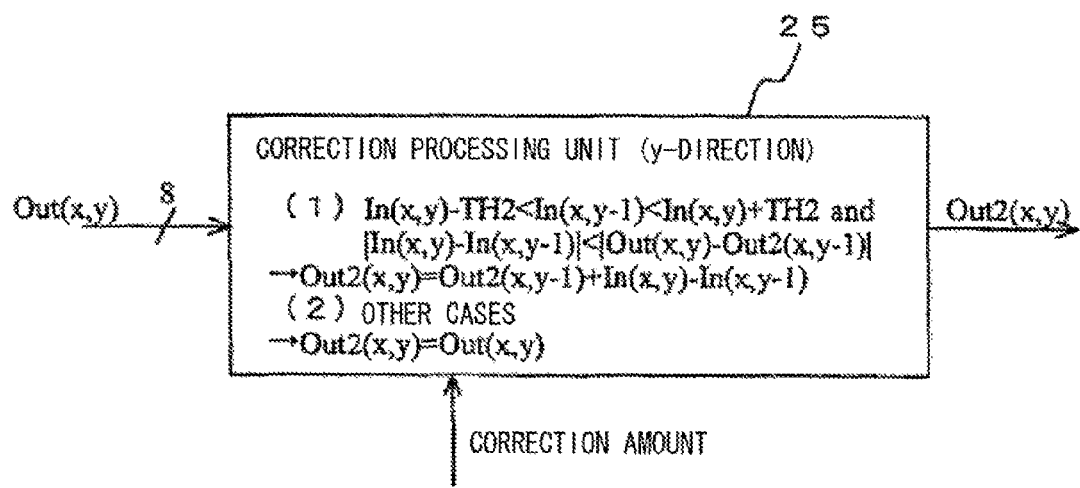
FIG. 9 shows a configuration of an extension correction unit to perform gray-scale extending processing in the y-direction.
Figure 10:
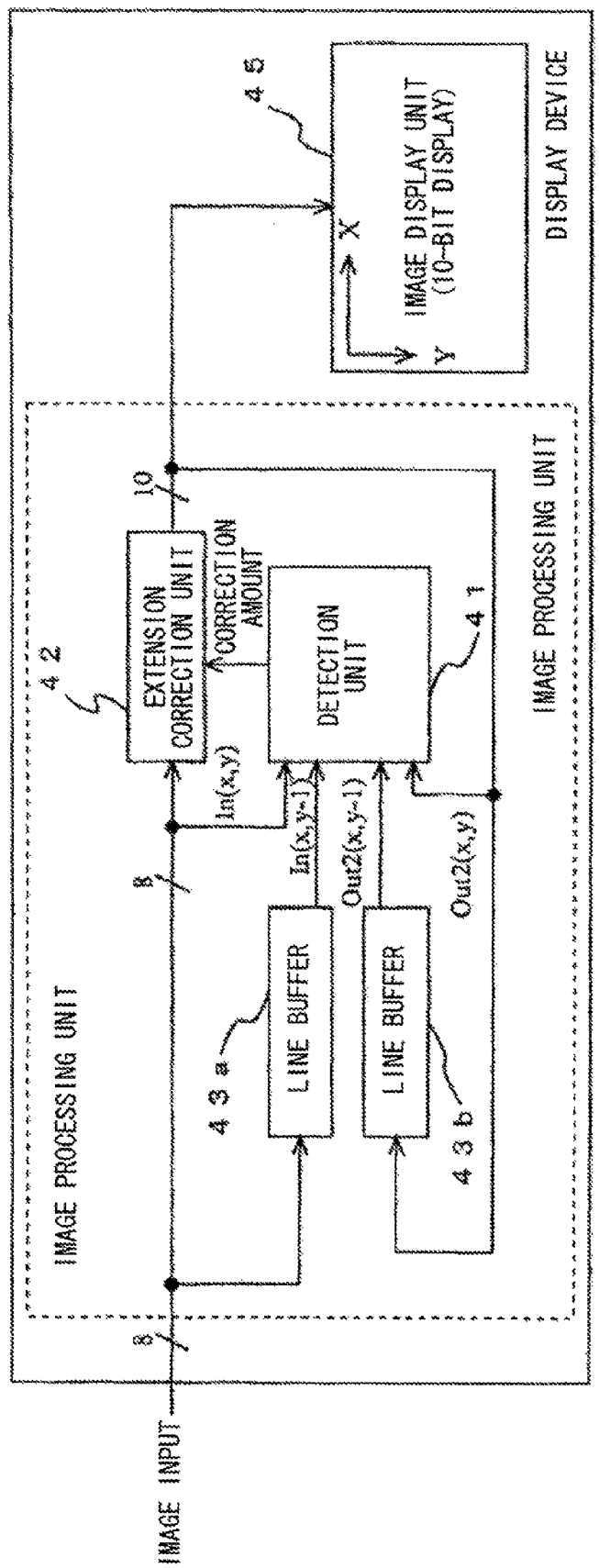
FIG. 10 shows a configuration of a display device in accordance with a second exemplary embodiment on which the present invention is implemented in a preferably manner.
Figure 11:
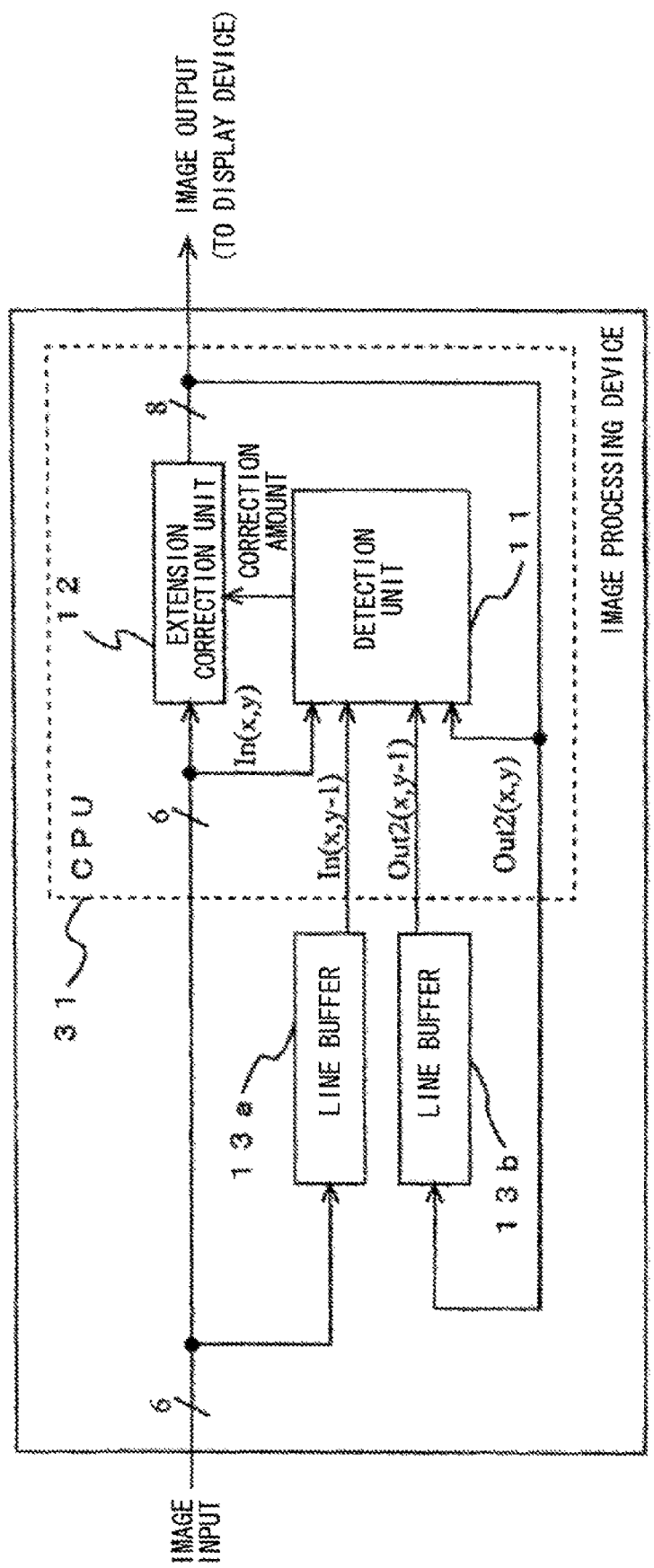
FIG. 11 shows a configuration of an image processing device in accordance with a third exemplary embodiment on which the present invention is implemented in a preferably manner.
Figure 12:
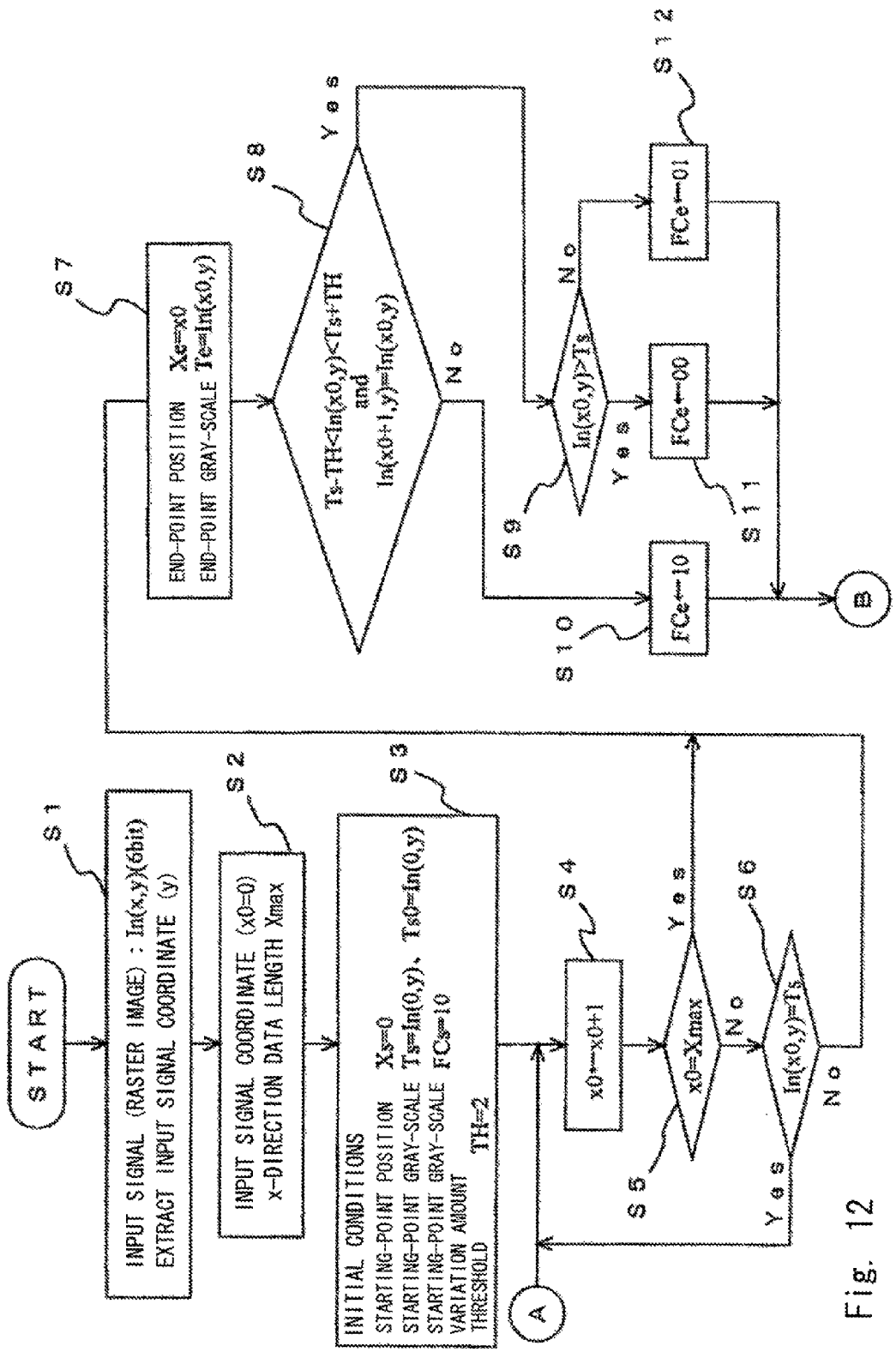
FIG. 12 shows a flow of image processing in an image processing device in accordance with a third exemplary embodiment.
Figure 13:
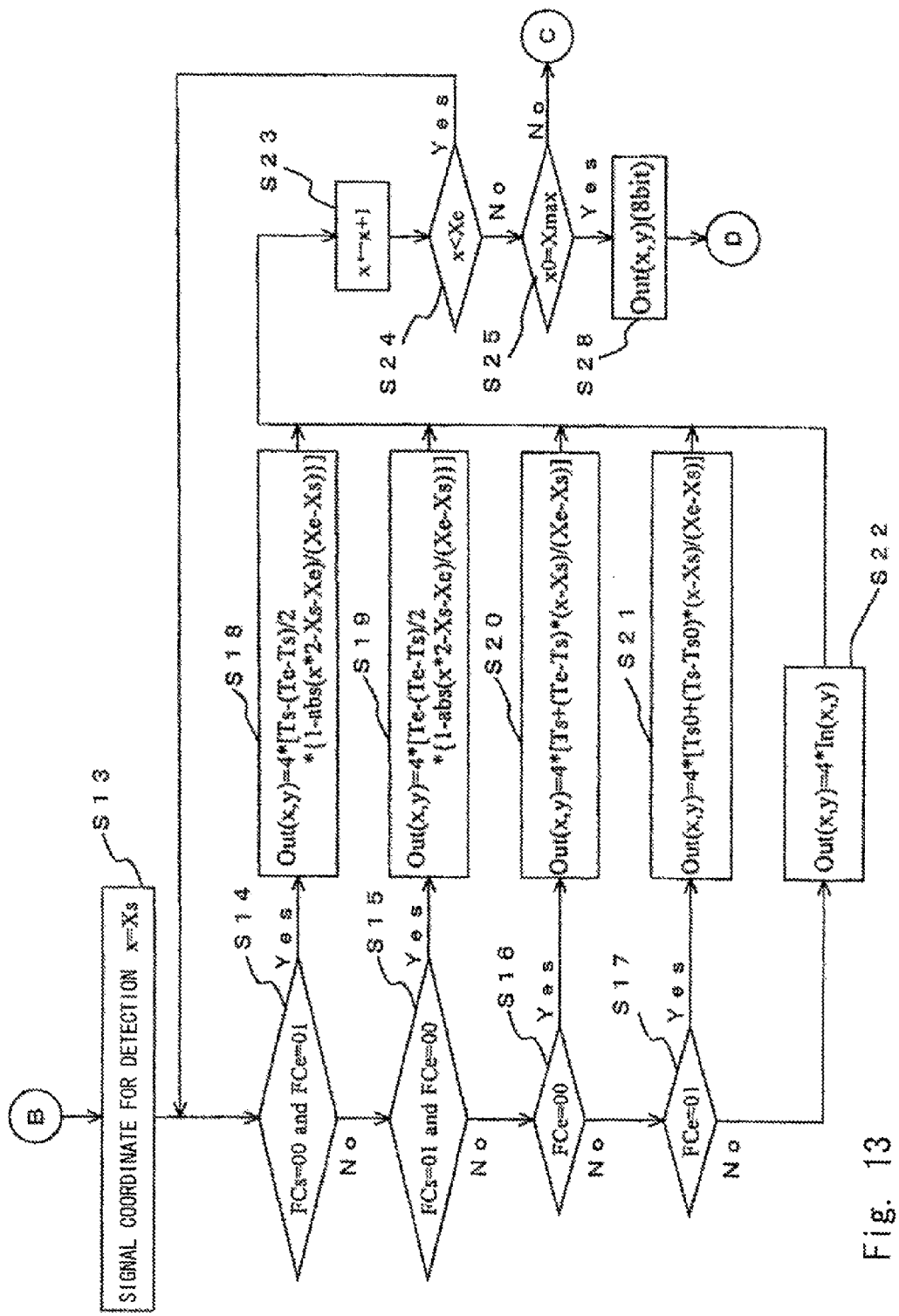
FIG. 13 shows a flow of image processing in an image processing device in accordance with a third exemplary embodiment.
Figure 14:
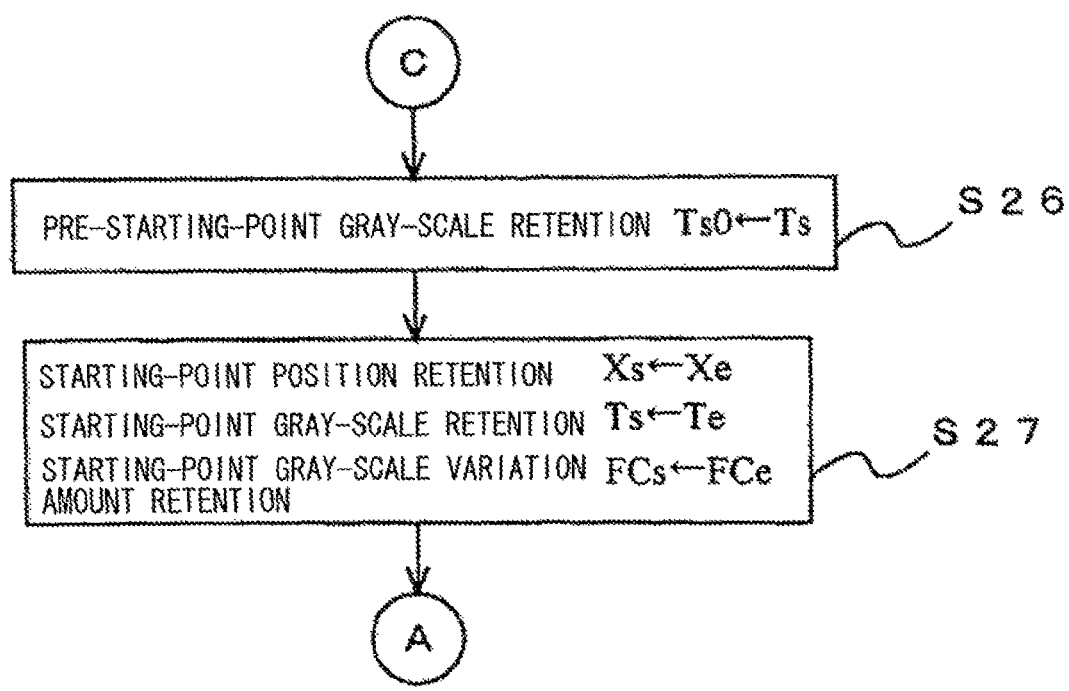
FIG. 14 shows a flow of image processing in an image processing device in accordance with a third exemplary embodiment.
Figure 15:
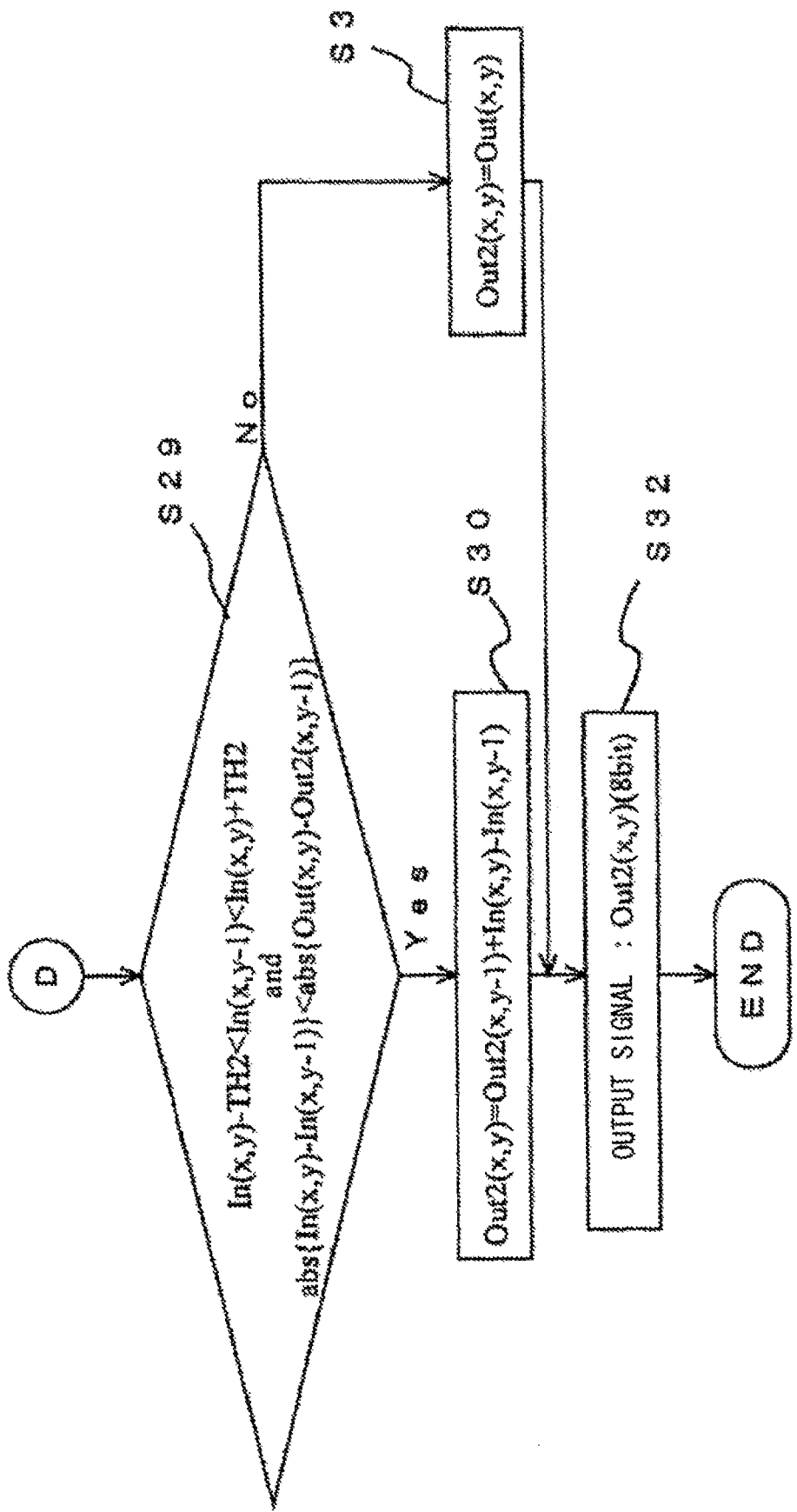
FIG. 15 shows a flow of image processing in an image processing device in accordance with a third exemplary embodiment.

EXPLANATION OF REFERENCE 11, 41 DETECTION UNIT
12, 42 EXTENSION CORRECTION UNIT
13A, 13B, 43A, 43B LINE BUFFER
21 DECISION OUTPUT UNIT
22 STARTING-POINT PARAMETER RETENTION UNIT
23 x-DIRECTION COUNTER
24 CORRECTION PROCESSING UNIT (X-DIRECTION)
25 CORRECTION PROCESSING UNIT (X-DIRECTION)
26 Parameter Extraction Unit
27 PARAMETER BUFFER
31 CPU
45 IMAGE DISPLAY UNIT

The invention claimed is:

1. An image processing device comprising:
a detection unit that detects a gray-scale correction application area that is an area where a gray-scale variation should be smoothed in a pixel row of an input digital image signal by successively scanning a pixel row of the digital signal; and
an extension correction unit that performs gray-scale correction processing on a gray-scale correction application area detected by the detection unit,
wherein in the detection unit, an output pixel row on which gray-scale correction processing was performed is fed back to and used as an input signal to the detection unit, and a gray-scale correction application area is detected by comparing an adjacent gray-scale difference of an input image signal with an adjacent gray-scale difference of the fed-back output pixel row.

2. The image processing device according to claim 1, further comprising a first line buffer that retains the input image signal, and a second line buffer that retains the output pixel row.

3. The image processing device according to claim 2, wherein an adjacent gray-scale difference of an input image signal is calculated based on a value of the input image signal and a value of an immediately preceding input image signal retained in the first line buffer.

4. The image processing device according to claim 2, wherein an adjacent gray-scale difference of an output image signal is calculated based on a value of the output pixel row and a value of an immediately preceding output pixel row retained in the second line buffer.

5. The image processing device according to claim 1, wherein a maximum acceptable value for an adjacent gray-scale difference of an output pixel row on which gray-scale correction processing was performed is set in the extension correction unit, and if the adjacent gray-scale difference exceeds the maximum acceptable value, gray-scale correction processing is not performed.

6. The image processing device according to claim 1, wherein in the extension correction unit, an amount of a gray-scale variation by the gray-scale correction processing in a boundary area where execution/non-execution of gray-scale correction processing is changed is made smaller than that of areas other than the boundary area.

7. An image processing device comprising:
a detection unit that detects a gray-scale correction application area that is an area where a gray-scale variation should be smoothed in a pixel row of an input digital image signal by successively scanning a pixel row of the digital signal;
an extension correction unit that performs gray-scale correction processing on a gray-scale correction application area detected by the detection unit; and
a digital image processing unit that performs processing involving gray-scale variation on an input image,
wherein in the detection unit, an output pixel row on which gray-scale correction processing was performed is fed back to and used as an input signal to the detection unit, and a gray-scale correction application area is detected by comparing an adjacent gray-scale difference of a signal on which image processing is not yet performed with an adjacent gray-scale difference between a signal on which image processing was performed and a fed-back output pixel row.

8. The image processing device according to claim 7, further comprising a third line buffer that retains a signal on which the image processing is not yet performed and a fourth line buffer that retains a signal on which the image processing was performed.

9. The image processing device according to claim 8, wherein an adjacent gray-scale difference of a signal on which image processing is not yet performed is calculated based on a value of a signal on which the image processing is not yet performed and a value of an immediately preceding signal retained in the third line buffer on which image processing is not yet performed.

10. The image processing device according to claim 8, wherein an adjacent gray-scale difference of a signal on which image processing was performed is calculated based on a value of a signal on which the image processing was performed and a value of an immediately preceding signal retained in the fourth line buffer on which image processing was performed.

11. The image processing device according to claim 7, wherein a maximum acceptable value for an adjacent gray-scale difference of an output pixel row on which gray-scale correction processing was performed is set in the extension correction unit, and if the adjacent gray-scale difference exceeds the maximum acceptable value, gray-scale correction processing is not performed.

12. The image processing device according to claim 7, wherein in the extension correction unit, an amount of a gray-scale variation by the gray-scale correction processing in a boundary area where execution/non-execution of gray-scale correction processing is changed is made smaller than that of areas other than the boundary area.

13. A display device comprising:
image processing unit comprising:
a detection unit that detects a gray-scale correction application area that is an area where a gray-scale variation should be smoothed in a pixel row of an input digital image signal by successively scanning a pixel row of the digital signal, feeding back an output pixel row on which gray-scale correction processing was performed and using the fed back output pixel row as an input signal, and comparing an adjacent gray-scale difference of the input image signal with an adjacent gray-scale difference of the fed-back output pixel row; and
an extension correction unit that performs gray-scale correction processing on a gray-scale correction application area detected by the detection unit; and
display unit that display an image according to an output signal from the image processing unit.

14. A display device comprising:
image processing unit comprising:
a detection unit that detects a gray-scale correction application area that is an area where a gray-scale variation should be smoothed in a pixel row of an input digital image signal by successively scanning a pixel row of the digital signal, feeding back an output pixel row on which gray-scale correction processing was performed and using the fed back output pixel row as an input signal, and comparing an adjacent gray-scale difference of a signal on which image processing is not yet performed with an adjacent gray-scale difference between a signal on which image processing was performed and the fed-back output pixel row;
an extension correction unit that performs gray-scale correction processing on a gray-scale correction application area detected by the detection unit; and a digital image processing unit that performs processing involving gray-scale variation on an input image; and display unit that display an image according to an output signal from the image processing unit.

15. An image processing method comprising:

detecting a gray-scale correction application area that is an area where a gray-scale variation should be smoothed in a pixel row of an input digital image signal by successively scanning a pixel row of the digital signal; and performing gray-scale correction processing on a gray-scale correction application area detected by the detecting, wherein in the detecting, an output pixel row on which gray-scale correction processing was performed is fed back to and used as an input signal, and a gray-scale correction application area is detected by comparing an adjacent gray-scale difference of an input image signal with an adjacent gray-scale difference of the fed-back output pixel row.

16. A recording medium storing a program that causes a computer to execute an image processing method according to claim 15.

17. An image processing method comprising:

detecting a gray-scale correction application area that is an area where a gray-scale variation should be smoothed in a pixel row of an input digital image signal by successively scanning a pixel row of the digital signal;

performing gray-scale correction processing on a gray-scale correction application area detected by the detecting; and performing processing involving gray-scale variation on an input image, wherein in the detecting, an output pixel row on which gray-scale correction processing was performed is fed back to and used as an input signal, and a gray-scale correction application area is detected by comparing an adjacent gray-scale difference of a signal on which image processing is not yet performed with an adjacent gray-scale difference between a signal on which image processing was performed and a fed-back output pixel row.

18. A recording medium storing a program that causes a computer to execute an image processing method according to claim 17.

19. A display device comprising:

image processing means comprising:

a detection unit that detects a gray-scale correction application area that is an area where a gray-scale variation should be smoothed in a pixel row of an input digital image signal by successively scanning a pixel row of the digital signal, feeding back an output pixel row on which gray-scale correction processing was performed and using the fed back output pixel row as an input signal, and comparing an adjacent gray-scale difference of the input image signal with an adjacent gray-scale difference of the fed-back output pixel row; and an extension correction unit that performs gray-scale correction processing on a gray-scale correction application area detected by the detection unit; and display means that display an image according to an output signal from the image processing means.

20. A display device comprising:

image processing means comprising:

a detection unit that detects a gray-scale correction application area that is an area where a gray-scale variation should be smoothed in a pixel row of an input digital image signal by successively scanning a pixel row of the digital signal, feeding back an output pixel row on which gray-scale correction processing was performed and using the fed back output pixel row as an input signal, and comparing an adjacent gray-scale difference of a signal on which image processing is not yet performed with an adjacent gray-scale difference between a signal on which image processing was performed and the fed-back output pixel row;

an extension correction unit that performs gray-scale correction processing on a gray-scale correction application area detected by the detection unit; and a digital image processing unit that performs processing involving gray-scale variation on an input image; and display means that display an image according to an output signal from the image processing means.

* * * * *